(12) United States Patent
Goto et al.

(10) Patent No.: US 9,944,212 B2
(45) Date of Patent: Apr. 17, 2018

(54) LAMINATED PANEL

(71) Applicant: HONDA MOTOR CO., LTD., Tokyo (JP)

(72) Inventors: Akira Goto, Saitama (JP); Kimito Nishiyama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/120,213

(22) PCT Filed: Feb. 18, 2015

(86) PCT No.: PCT/JP2015/054498
§ 371 (c)(1),
(2) Date: Aug. 19, 2016

(87) PCT Pub. No.: WO2015/125838
PCT Pub. Date: Aug. 27, 2015

(65) Prior Publication Data
US 2017/0072827 A1    Mar. 16, 2017

(30) Foreign Application Priority Data
Feb. 19, 2014    (JP) .................. 2014-029062

(51) Int. Cl.
| | |
|---|---|
| *B60P 1/43* | (2006.01) |
| *B32B 3/28* | (2006.01) |
| *B32B 3/26* | (2006.01) |
| *B32B 7/04* | (2006.01) |
| *B32B 7/08* | (2006.01) |

(Continued)

(52) U.S. Cl.
CPC ....... *B60P 1/43* (2013.01); *B32B 3/02* (2013.01); *B32B 3/08* (2013.01); *B32B 3/10* (2013.01); *B32B 3/266* (2013.01); *B32B 3/28* (2013.01); *B32B 7/045* (2013.01); *B32B 7/08* (2013.01); *B32B 7/12* (2013.01); *B32B 7/14* (2013.01);

(Continued)

(58) Field of Classification Search
CPC ........................................................ B60P 1/43
USPC .......................................................... 428/99
See application file for complete search history.

(56) References Cited

FOREIGN PATENT DOCUMENTS

| | | |
|---|---|---|
| CN | 103010316 A | 4/2013 |
| JP | 58-188275 | 12/1983 |

(Continued)

OTHER PUBLICATIONS

Chinese Office Action dated Mar. 28, 2017, along with an English translation, 13 pages.
International Search Report, dated May 19, 2015 (May 19, 2015).

*Primary Examiner* — Brent T O'Hern
(74) *Attorney, Agent, or Firm* — Rankin, Hill & Clark LLP

(57) ABSTRACT

A laminated panel is provided with: a core panel having a vertical wall portion which extends in a direction which intersects with a panel surface, and a flat portion which is formed to extend along the panel surface from an end portion of the vertical wall portion; a pair of face plates which sandwich the core panel from both sides; and a structural material in which a rectangular cross-section portion which sandwiches the flat portion of the core panel between the rectangular cross-section portion and one of the face plates is disposed. The structural material is provided with peripheral edge structural materials which are disposed along a pair of opposing edge portions of a peripheral edge of the laminated panel, and connecting structural materials which extend in a direction which intersects with the peripheral edge structural materials.

12 Claims, 16 Drawing Sheets

(51) Int. Cl.
 *B32B 7/12* (2006.01)
 *B32B 7/14* (2006.01)
 *B32B 3/02* (2006.01)
 *B32B 3/08* (2006.01)
 *B32B 3/10* (2006.01)

(52) U.S. Cl.
 CPC ....... *B32B 2307/54* (2013.01); *B32B 2605/00* (2013.01); *B32B 2607/00* (2013.01)

(56) References Cited

FOREIGN PATENT DOCUMENTS

| | | |
|---|---|---|
| JP | 62-91814 | 6/1987 |
| JP | 02-289758 | 11/1990 |
| JP | 07-189419 | 7/1995 |
| JP | 2000-248687 | 9/2000 |
| JP | 2003-226186 | 8/2003 |
| JP | 2006-097461 | 4/2006 |

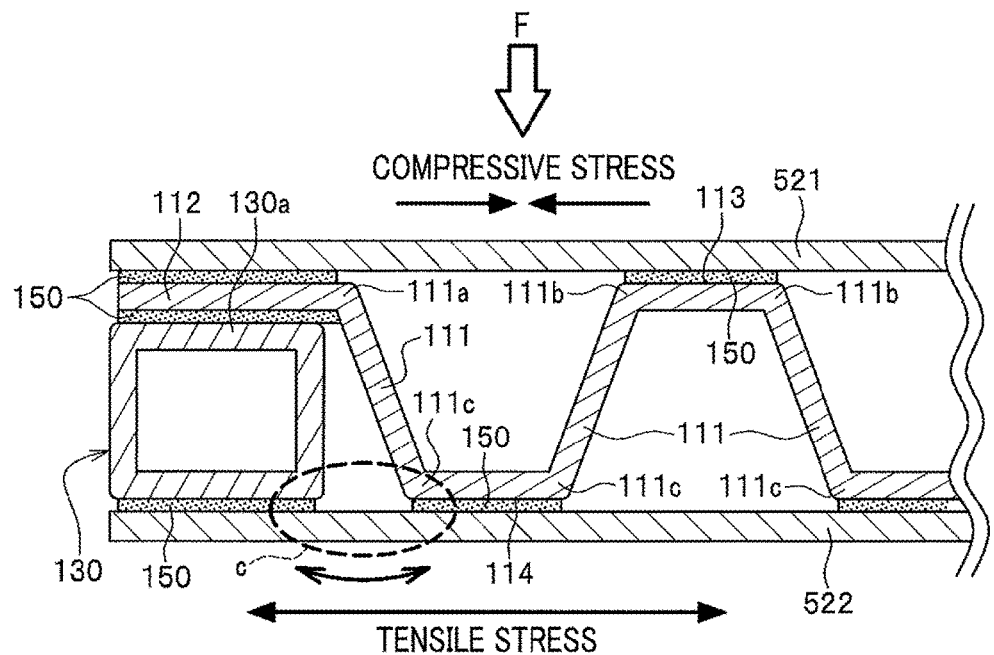
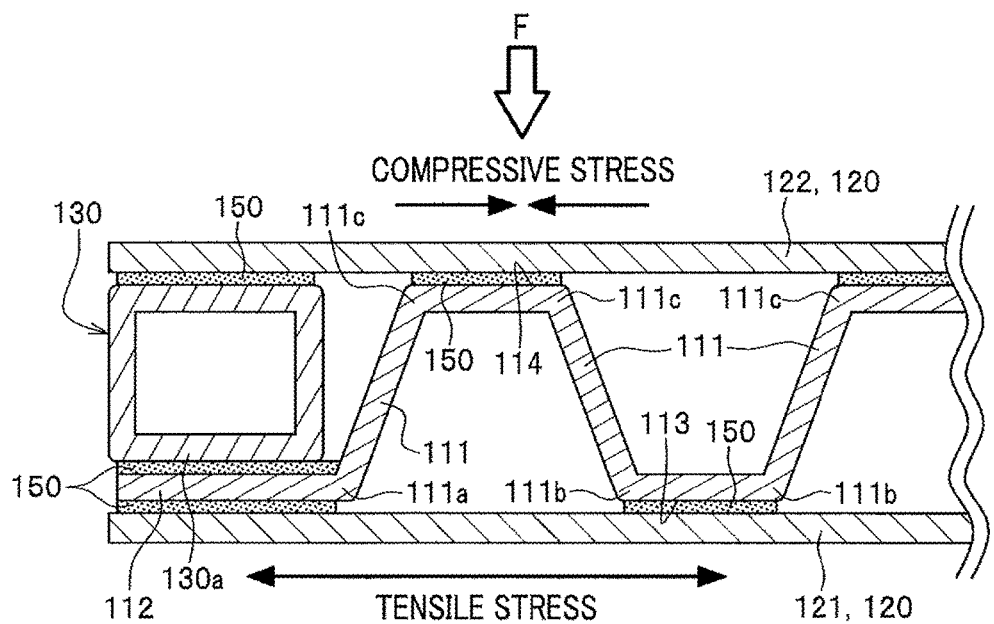

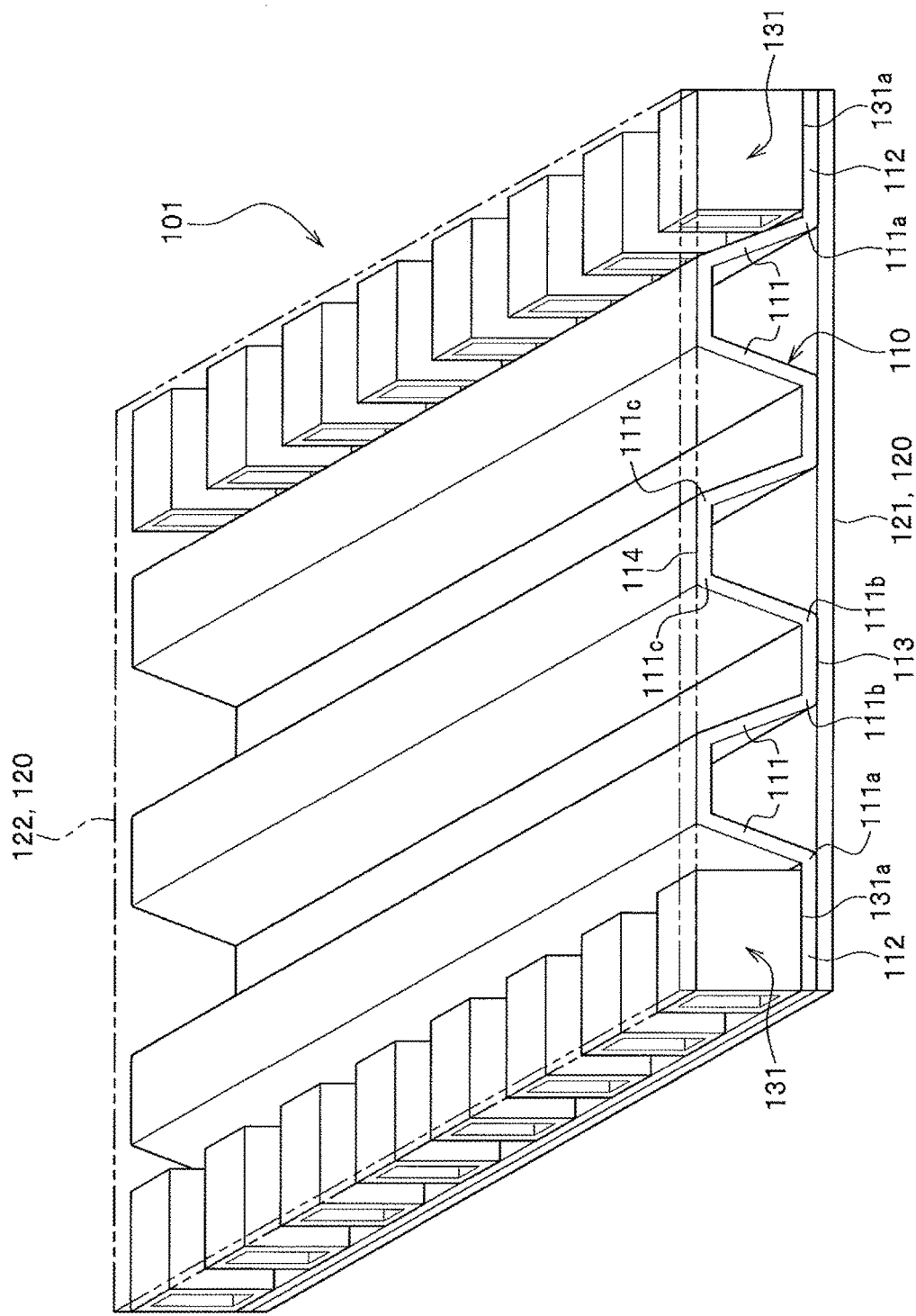

LAMINATED PANEL

TECHNICAL FIELD

The present invention relates to a laminated panel.

BACKGROUND ART

Vehicles are known which make it possible to get down a slope rearward from a vehicle body rear opening of the vehicle for the purpose of mounting a wheelchair in which a care receiver sits, or the like, on a vehicle rear space.

Patent Literature 1 discloses a slope device for a vehicle which includes a plurality of slope sections slidably connected with each other and makes it possible to get down the slope to the ground from the vehicle in an expanded state of the slope sections and to take a wheelchair or the like into or out of the vehicle. The slope device for a vehicle disclosed in Patent Literature 1 is obtained by shaping a floor member by extrusion processing of aluminum alloy. To form the floor member by extrusion, the slope body needs to have a constant cross-section shape along the direction of extrusion.

Patent Literature 2 discloses what is called "aori" (side plate parts surrounding a rear deck) of a truck, in which a laminated structure composed of a metallic flat plate, a corrugated plate and a metallic flat plate is disposed on the outer surface side and a plate material having shock-absorbing capability is disposed on the inner surface side.

CITATION LIST

Patent Literature

Patent Literature 1: Japanese Unexamined Patent Application Publication No. 2003-226186 (FIG. 1)
Patent Literature 2: Japanese Unexamined Utility Model Application Publication No. 58-188275 (FIG. 1)

SUMMARY OF THE INVENTION

Technical Problem

The slope device for a vehicle described in Patent Literature 1 is obtained by shaping the floor member by extrusion processing of aluminum alloy. In this case, the slope body needs to have a constant cross-section shape along the direction of extrusion in order to form the floor member by extrusion. For this reason, for example, a rib for reinforcing the floor member or the like needs to be formed with a constant cross-section along the direction of extrusion. Accordingly, such a rib cannot be provided in the middle of the floor member in the direction of extrusion and thus the rib has to be formed in an unneeded region (e.g., in the front region in the direction of extrusion).

Moreover, the rib cannot be provided in a direction which intersects with the direction of extrusion and the rib cannot be provided in a region at which rigidity and strength need to be increased.

Where a slope is constituted using the laminated structure described in Patent Literature 2, weight and cost thereof are expected to be reduced, because the slope body need not be formed by extrusion as in the slope device for a vehicle described in Patent Literature 1.

However, the device described in Patent Literature 2 is devised for the purpose of providing "aori" of a truck and thus there is no idea of reinforcing needed regions. For example, where the laminated structure described in Patent Literature 2 is reinforced to be used in the slope, it is conceived that a portion of the corrugated plate is cut out to allow a core material (structural material or the like) to lie in the cut-out portion. However, cutting out the corrugated plate leads to a problem in that strength and rigidity become decreased at the boundary between the core material and the corrugated plate at the periphery of the core material.

The present invention has been made in view of these problems and an object of the invention is to provide a laminated panel which makes it possible to eliminate regions having locally low strength and low rigidity and to suppress stress concentration to improve rigidity, strength, and surface rigidity.

Solution to Problem

In order to solve the above problems, the present invention provides a laminated panel including: a core panel having a vertical wall portion which extends in a direction which intersects with a panel surface, and a flat portion which is formed to extend along the panel surface from an end portion of the vertical wall portion; a pair of face plates which sandwich the core panel from both sides; and a structural material in which a rectangular cross-section portion which sandwiches the flat portion of the core panel between the rectangular cross-section portion and one of the face plates is disposed, the structural material including: a peripheral edge structural material which is disposed along peripheral edges of the pair of face plates; and a connecting structural material which extends in a direction which intersects with the peripheral edge structural materials.

According to this configuration, the core panel exists at the boundary between the core panel and the structural material, thus making it possible to provide the core panel all over the surface of the laminated panel. Accordingly, regions having locally low strength and low rigidity can be eliminated and thus stress concentration can be suppressed to improve rigidity and strength of the laminated panel. Moreover, where an end of the laminated panel is held by an end covering member (for example, a rail) for the purpose of reinforcing regions having low strength and low rigidity, no extension portion needs to be provided on the rail. Consequently, the face plate is not decreased in area, and where the laminated panel is utilized as, for example, a slope, a loading platform in which an available region of the face plate is maximally extended can be obtained.

Moreover, the structural material includes the peripheral edge structural materials which are disposed along a pair of edge portions of the laminated panel, and the connecting structural materials which connect the peripheral edge structural materials with each other, thereby making it possible to improve surface rigidity of the laminated panel.

The laminated panel may adopt a configuration such that it further includes an end covering member having a holding portion which holds ends of the pair of face plates, and at least one of the connecting structural material and the peripheral edge structural material is held by the holding portion of the end covering member.

According to this configuration, a load transmitted via the laminated panel to the structural material can be transmitted to and dispersed on the rail, thereby making it possible to improve rigidity and strength of the laminated panel.

The laminated panel may adopt a configuration such that at least one of the connecting structural material and the peripheral edge structural material is disposed to extend in a direction which intersects with the end covering member, and an end portion thereof in a direction of extension is held by the holding portion of the end covering member.

According to this configuration, a load transmitted via the laminated panel to the structural material can be transmitted to and dispersed on the rail, thereby making it possible to improve rigidity and strength of the laminated panel.

The laminated panel may adopt a configuration such that one of the face plates includes an opening for allowing a specific component to be inserted therethrough, near the connecting structural material; a component attachment bracket for attaching the specific component thereto is fixed to an edge of the opening; and the specific component is fixed to the component attachment bracket with being inserted into the opening.

According to this configuration, the component (for example, a slope driving motor) is fixed to the attachment bracket secured to the structural material with a portion of the component being inserted through through-holes provided in one face plate and the core panel, thereby making it possible to reduce the amount by which the component projects from the laminated panel in the fixed state, to allow for compact storage and to secure attachment rigidity and strength of the component.

The laminated panel may adopt a configuration such that the connecting structural material and one of the face plates include a bolt through-part, respectively; the connecting structural material includes a nut at a position facing the bolt through-parts in a cross-section thereof; and the component attachment bracket is fastened by a bolt to the nut through the bolt through-parts.

According to this configuration, the component attachment bracket can be directly bolted to the connecting structural material and thus attachment rigidity and strength of the component attachment bracket can be improved.

The laminated panel may adopt a configuration such that the bolt through-part in the connecting structural material is formed into a slit in a longitudinal direction of the connecting structural material.

According to this configuration, the bolt through-part in the connecting structural material is formed into a slit, thereby making it possible, as compared to a case where the bolt through-part is formed into a hole, to easily align the bolt through-part in the connecting structural material with the bolt through-part in the face plate. Also, the slit is formed in the longitudinal direction of the connecting structural material, and where the connecting structural material is formed by extrusion, the slit can be formed simultaneously with the extrusion, thus facilitating the forming.

The laminated panel may adopt a configuration such that the bolt through-part in the connecting structural material is formed at a plurality of locations at predetermined intervals in a longitudinal direction of the connecting structural material.

According to this configuration, connection by bolting can be carried out through the bolt through-part at a position which corresponds to the bolt through-part in the face plate, of the bolt through-parts provided at the plurality of locations in the longitudinal direction of the connecting structural material, thus allowing the bolt through-part to be easily aligned with the bolt through-part in the face plate 121. Moreover, as compared to the case where the bolt through-part is formed into a slit, the closed cross-section shape of the connecting structural material can be maintained and thus rigidity and strength can be further secured.

Advantageous Effects of the Invention

The present invention allows a laminated panel to be provided, which makes it possible to eliminate regions having locally low strength and low rigidity and to suppress stress concentration to improve rigidity, strength, and surface rigidity.

BRIEF DESCRIPTION OF DRAWINGS

FIG. 6A is an explanatory view of loads for the case of the laminated panel according to the first embodiment of the present invention being properly placed.

FIG. 6B is an explanatory view of loads for the case of the laminated panel according to the first embodiment of the present invention being placed with two sides upside down.

FIG. 7 is a cross-section view showing one modified example of a structural material in the laminated panel according to the first embodiment of the present invention.

DESCRIPTION OF EMBODIMENTS

First Embodiment

Embodiments of the present invention will be described in detail with reference to the drawings. In the description below, the same component is given the same reference sign and duplicate description is omitted. Note that the embodiments of the present invention will be described, defining a traveling direction side of a vehicle as "front", a retreat direction side of the vehicle as "rear", a vertical upper side as "up", a vertical lower side as "down", and a vehicle width direction side as "right" and "left".

Figure 1:
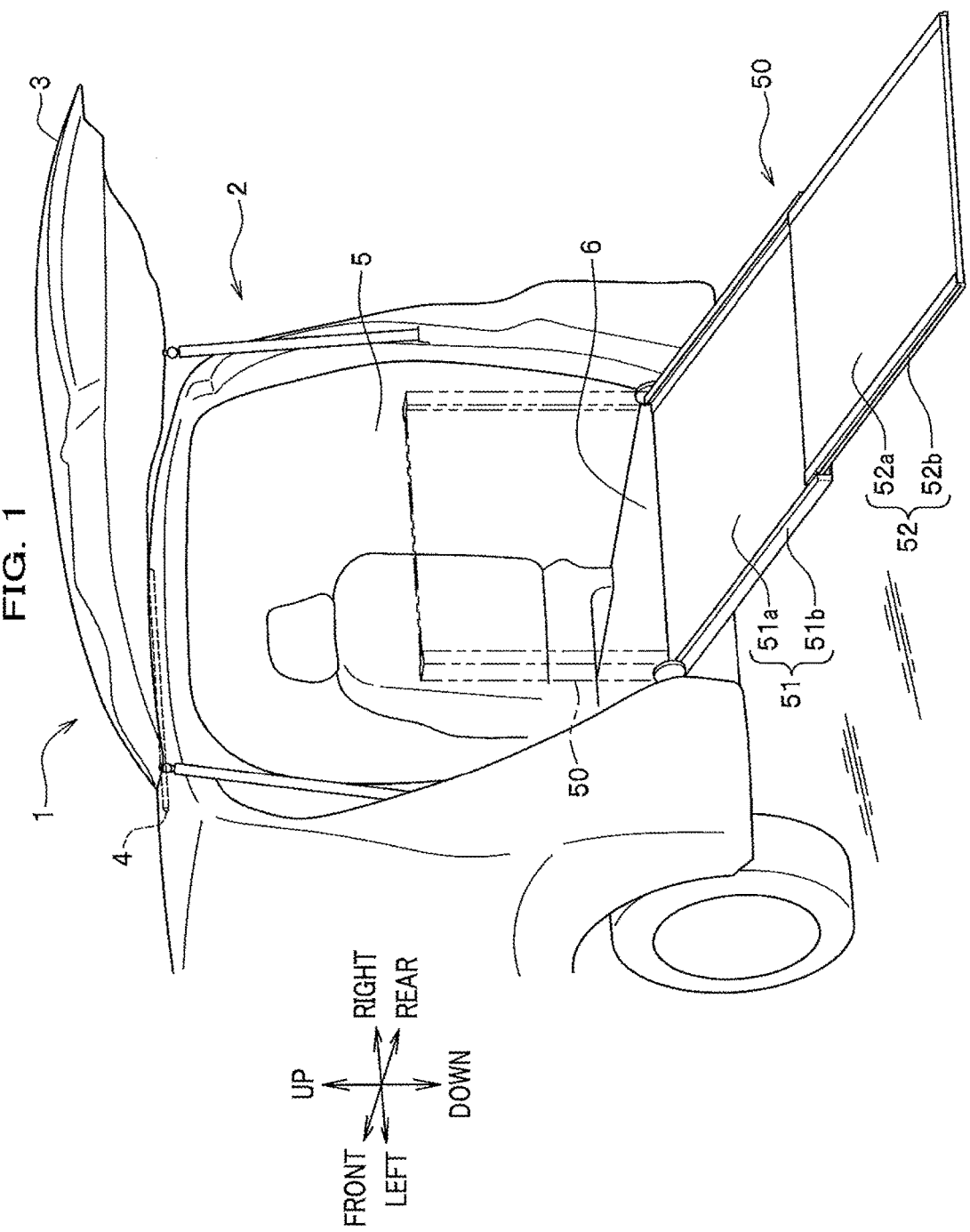
FIG. 1 is a perspective view showing a vehicle provided with a slope to which a laminated panel according to a first embodiment of the present invention is applied.

As shown in FIG. 1, a vehicle 1 provided with a slope to which a laminated panel according to a first embodiment of the present invention is applied is, for example, a one-box car, a station wagon, a hatchback car, or the like. Provided at the rear of a vehicle body 2 is a flip-up back door 3 engaged with a hinge part 4. Note that, as long as the vehicle 1 is one provided with the back door 3 at the rear of the vehicle body 2, types and forms thereof are not particularly limited.

As shown in FIG. 1, formed at the rear of the vehicle body 2 is a vehicle body rear opening 5 which is opened rearward or closed by the back door 3. An upper end of the back door 3 is rotatably attached to the hinge part 4 at right and left ends on an upper side of the vehicle body rear opening 5, thereby allowing the back door 3 to rotate with the hinge part 4 as the center to open or close the vehicle body rear opening 5.

A slope 50 is provided in a vehicle interior at the rear of the vehicle body 2. The slope 50 is accommodated in an upright state near the back door 3 when not used (see FIG. 1, dashed line), and is laid to rearward of the vehicle 1 from the vehicle body rear opening 5 to be expanded when used. Note that, when not used (see FIG. 1, dashed line), the slope 50 can also be laid to the vehicle interior side to be accommodated in a state placed on a rear floor 6. Moreover, in the upright state when not used, the slope 50 is allowed to be fixed by a locking device (not shown) to right and left sides of the vehicle body rear opening 5

Herein, particulars of the slope 50 will be described with reference to FIG. 1. As shown in FIG. 1, the slope 50 is a two-stage slide slope and includes a first slope 51 of which an end portion on the vehicle body side is rotatably attached to a lower side of the vehicle body rear opening 5 at the rear of the vehicle body 2, and a second slope 52 which is slidably provided on an upper surface of the first slope 51 when expanded.

The first slope 51 is a lower stage slope and includes a plate 51a which is a slope body, and rails 51b, 51b provided on right and left sides of the plate 51a. The second slope 52 is an upper stage slope and includes a plate 52a which is a slope body, and rails 52b, 52b provided on right and left sides of the plate 52a.

Figure 2:
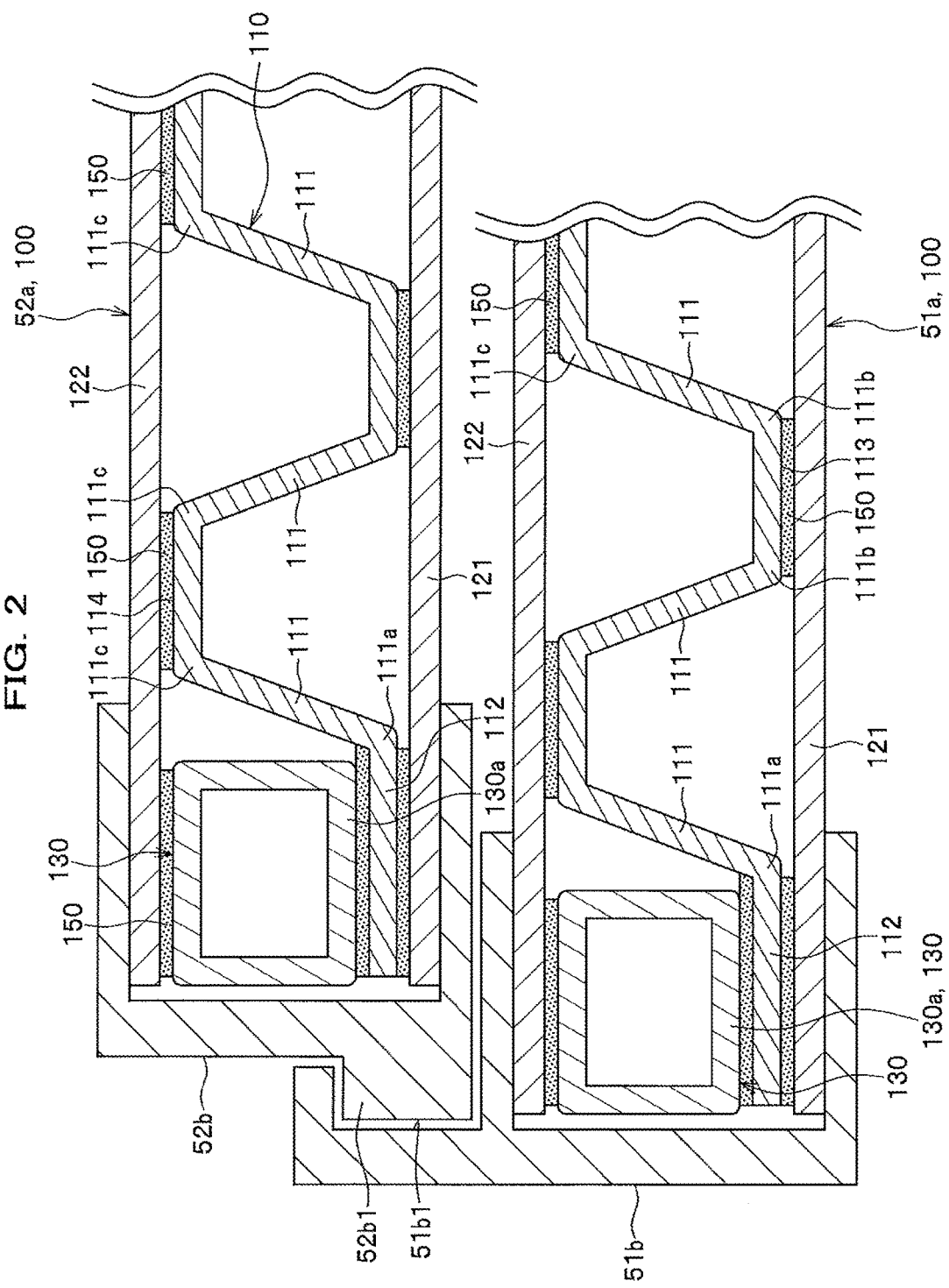
FIG. 2 is a cross-section view of the slope to which the laminated panel according to the first embodiment of the present invention is applied.

As shown in FIG. 2, a convex portion 52b1 formed on an outer side of the rail 52b is slidably fitted into a concave portion 51b1 formed on the rail 51b of the first slope 51.

Note that configuration of a laminated panel 100 constituting the slope 50 will be described later with reference to FIG. 3 and FIG. 4.

In use of the slope 50, the user opens the back door 3 at the rear of the vehicle 1, slides the first slope 51 and the second slope 52 of the slope 50 sequentially to rearward of the vehicle, and then expands the slope 50 to lay on a road surface or the like. In a state of the slope 50 being expanded, the slope 50 constitutes a slope having a predetermined angle of inclination.

The present invention is characterized by an end reinforcing structure in the laminated panel 100 constituting the slope 50. Accordingly, the end reinforcing structure is not limited to the structure of the rails 52b, 52b in FIG. 2. Moreover, in the rails 51b, 51b, the inside of the rails 51b, 51b, i.e., a holding portion which holds end portions of the plates 51a, 51a, gets involved with the present invention, and a slide structure portion on the outer side of the slope 50 does not directly get involved with the present invention. Accordingly, the description below will be given, taking an end covering member 140 for example, which is other than the slide structure portion on the outer side of the slope 50 and has a U-shape in cross-sectional view.

Figure 3:
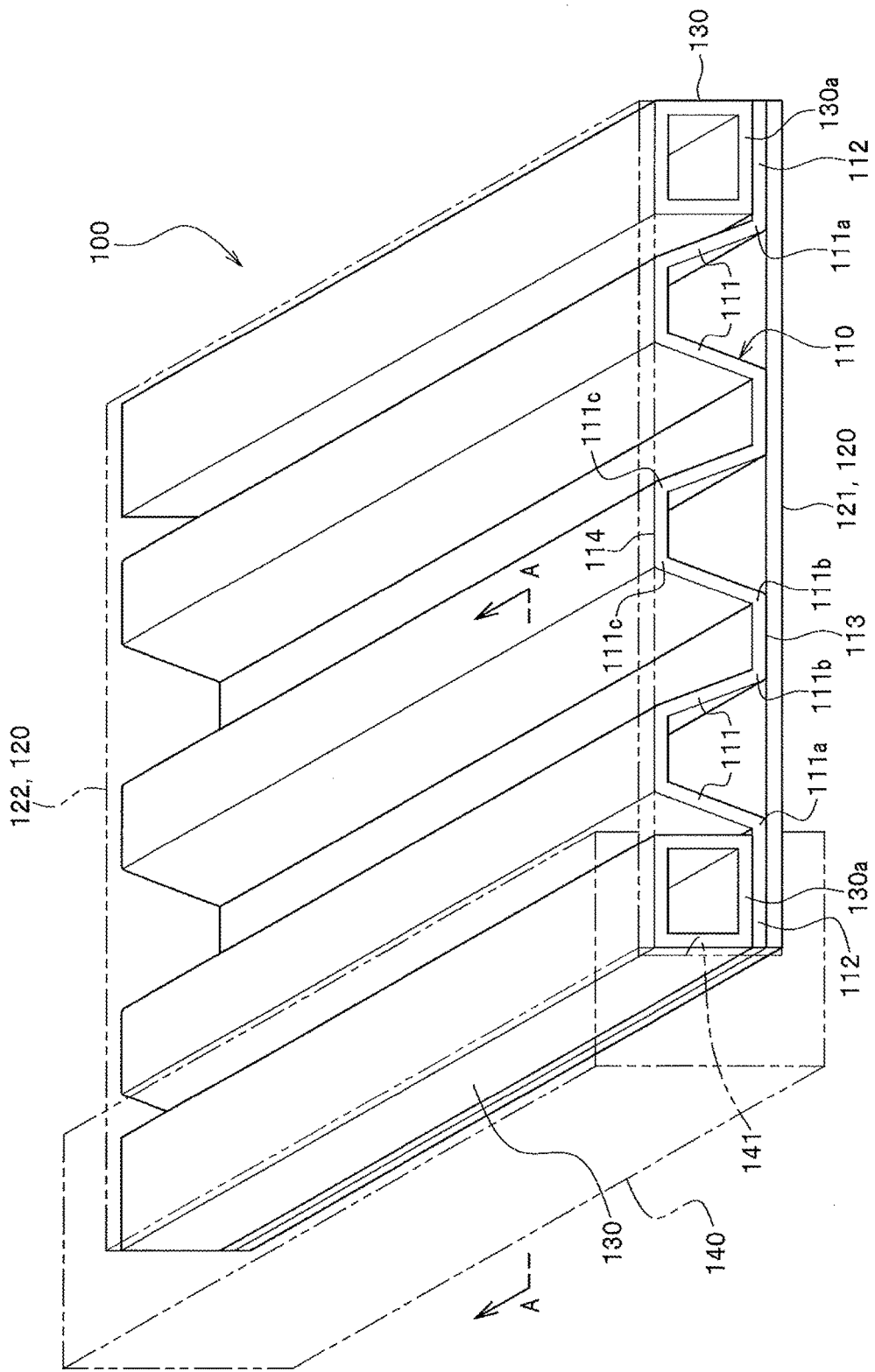
FIG. 3 is a perspective view showing a configuration of the laminated panel according to the first embodiment of the present invention.
Figure 4:
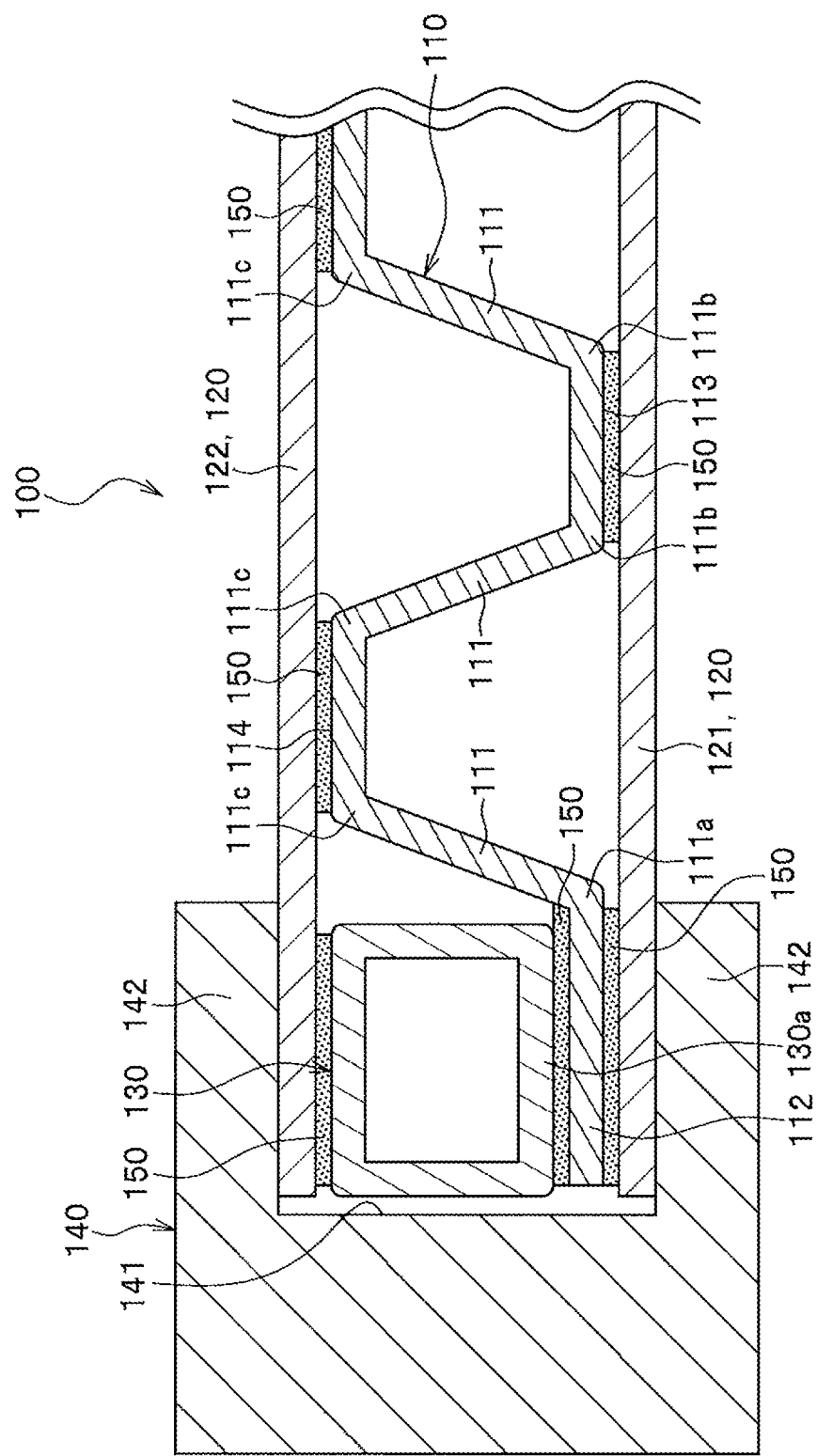
FIG. 4 is a cross-section view taken in the direction of arrows A-A in FIG. 3.

As shown in FIG. 3 and FIG. 4, the laminated panel 100 is mainly provided with a core panel 110 having a vertical wall portion 111 which extends in a direction which intersects with a panel surface, and a flange 112 (flat portion set forth in claim 1) which is formed to extend along the panel surface from an end portion 111a of the vertical wall portion 111; a pair of face plates 120 (121, 122) which sandwich the core panel 110 from both sides; and a structural material 130 in which a rectangular cross-section portion 130a which sandwiches the flange 112 of the core panel 110 between the rectangular cross-section portion 130a and one face plate 121 (120) is disposed. More specifically, when viewed from the other face plate 122 (120), the laminated panel 100 has a configuration in which the structural material 130 having the rectangular cross-section portion 130a is disposed between the flange 112 of the core panel 110 and the other face plate 122.

Moreover, an end of the laminated panel 100 is held by a holding portion 142 of the end covering member 140, thereby allowing the end portion to be reinforced.

The laminated panel 100 can be used in, for example, the second slope 52 of the slope 50 (see FIG. 1).

<Core Panel>

The core panel 110 is formed of, for example, aluminum alloy by cold press. The core panel 110 includes the vertical wall portion 111 which extends in a direction which intersects with the pair of face plates 120 (121, 122), the flange 112 (flat portion) which is formed to extend along one face plate 121 from the end portion 111a of the vertical wall portion 111 to abut on the face plate 121, a first flat portion 113 which is formed to extend along one face plate 121, a first bending portion 111b which connects one ends of the vertical wall portions 111 next to each other with the first flat portion 113, a second flat portion 114 which is formed to extend along the other face plate 122, and a second bending portion 111c which connects the other ends of the vertical wall portions 111 next to each other with the second flat portion 114.

More specifically, the core panel 110 includes the flange 112 constituting the flat portion which is formed to extend along one face plate 121 from the end portion 111a of the vertical wall portion 111, the first flat portion 113 which is formed to extend along one face plate 121 from the first bending portion 111b, and the second flat portion 114 which is formed to extend along the other face plate 122 from the second bending portion 111c, and as shown in FIG. 4, constitutes a corrugated plate in which the vertical wall portions 111, the first flat portions 113 and the second flat portions 114 form a continuous shape of a trapezoid in cross-sectional view.

Note that the above aluminum alloy may be obtained by any of non-thermal treatment or thermal treatment. In the case of aluminum alloy by non-thermal treatment, a proper strength is obtained during production or by cold working such as rolling, extrusion, pultrusion or the like. In the case of aluminum alloy by thermal treatment, a proper strength is obtained by quenching, tempering or the like. In this case, utilization of bake hardening at a time of heating and hardening of adhesives is effective.

The core panel 110 will be described in detail. The core panel 110 is formed by press-working aluminum alloy by cold press. More specifically, the core panel 110 is press-worked to bend a flat plate of aluminum alloy by cold press at the end portion 111a, the first bending portion 111b and the second bending portion 111c of the vertical wall portion 111, and to bend the flat plate back in a direction which intersects with the face plates 120. This forms the vertical wall portion 111 which constitutes an inclined portion extending in the up-down direction of the laminated panel 100, the flange 112 which is sandwiched between the structural material 130 and the face plates 120 (121, 122) at right and left end portions of the laminated panel 100, and the first flat portion 113 and the second flat portion 114 which support the face plates 120 with their faces in the width direction of the laminated panel 100.

The vertical wall portion 111 which extends in the up-down direction of the laminated panel 100 is formed, thereby making it possible to improve rigidity and strength in the up-down direction of the laminated panel 100.

Moreover, the flange 112 is formed at right and left end portions of the core panel 110, thereby making it possible to sandwich the flange 112 between the structural material 130 and one face plate 121.

Note that the core panel 110 may have any structure as long as it is provided with the flat portion (the flange 112 in the present embodiment) which is formed to extend along one face plate 121 from the end portion 111a of the vertical wall portion 111. For example, the vertical wall portion 111 may be one extending in the right-left direction (width direction) of the laminated panel 100, or may be one extending in the up-down direction (direction perpendicular to the width direction) of the laminated panel 100. Alternatively, the vertical wall portion 111 may be of what is called a lattice shape structure or a honeycomb structure, which is combined by a portion extending in the up-down direction and a portion extending in the right-left direction. Moreover, the vertical wall portion 111 may be of a structure having an irregular shape cross-section in which a plurality of longitudinal ridge lines and transverse ridge lines are nested.

<Face Plate>

The face plates 120 are each composed of, for example, aluminum alloy plate. The face plates 120 are composed of one face plate 121 which holds the core panel 110 from the lower side, and the other face plate 122 which holds the core panel 110 from the upper side. One face plate 121 and the other face plate 122 may have any form as long as they have the same shape and dimension in the right-left direction (width direction) of the laminated panel 100, and thus lengths in the up-down direction and thicknesses and materials thereof may differ from each other. Note that, where one face plate 121 and the other face plate 122 are of the same material, a reduction in sourcing cost and an improvement in workability can be expected.

<Structural Material>

The structural material 130 is a reinforcing member for reinforcing corresponding regions of the laminated panel 100. The structural material 130 is disposed between the pair of face plates 120 (121, 122) so as to sandwich the flange 112 of the core panel 110 between the structural material 130 and one face plate 121. More specifically, the structural material 130 is disposed between the flange 112 and the other face plate 122 to be bonded to the pair of face plates 120 (121, 122).

Note that "bonding" in the present invention is a concept including any of adhesion, fastening and joining. Description will be given later with reference to FIG. 10.

In the present embodiment, the structural material 130 includes the rectangular cross-section portion 130a, and the flange 112 of the core panel 110 is sandwiched between, and bonded via an adhesive 150 to, the rectangular cross-section portion 130a and one face plate 121.

The structural material 130 is a square pipe composed of, for example, a hollow aluminum alloy by extrusion. The structural material 130 may be solid, and the rectangular cross-section may have any cross-section shape. Moreover, since the structural material 130 is a member for reinforcing the corresponding regions of the laminated panel 100, it has a specific location, shape and length according to the corresponding regions.

<Adhesive>

As shown in FIG. 4, the laminated panel 100 allows the core panel 110, the pair of face plates 120 (121, 122) and the structural material 130 to be joined (adhere) via the adhesive 150 to each other to become integrated. More specifically, in the laminated panel 100, the rectangular cross-section portion 130a of the structural material 130 and an upper surface of the flange 112 of the core panel 110, a lower surface of the flange 112 and one face plate 121, the first flat portion 113 of the core panel 110 and one face plate 121, the structural material 130 and the other face plate 122, and the second flat portion 114 of the core panel 110 and the other face plate 122, are joined via the adhesive 150 to each other, respectively.

<Rail>

The present embodiment employs the end covering member 140 as an example of an end covering member which covers the end of the laminated panel 100. The end covering member 140 is a rod-like member for allowing the laminated panel 100 to be oriented in a constant direction, and in addition to the function of reinforcing the end of the laminated panel 100, serves as a protection member which protects an end surface and corner portions of the end.

The end of the laminated panel 100 is held by the holding portion 142 of the end covering member 140 which is an end covering member.

The present embodiment employs the end covering member 140 as an end covering member, thereby allowing the laminated panel 100 to be used in, for example, the slope 50 (see FIG. 1). Where the laminated panel 100 is used as the slope 50 (see FIG. 1), the end covering member 140 constitutes part of the slide portion. For example, where the laminated panel 100 is used in the second slope 52 (see FIG. 1), the laminated panel 100 corresponds to the plate 52a which is a slope body, and the end covering member 140 corresponds to the rails 52b, 52b provided on the right and left sides of the plate 52a.

As shown in FIG. 3 and FIG. 4, the end covering member 140 includes a groove portion 141 on which the end (end portions of the pair of face plates 120 and the structural material 130) of the laminated panel 100 abuts, and the holding portion 142 which holds the end of the laminated panel 100. The end covering member 140 is disposed along the edge of the laminated panel 100. In the case of FIG. 3 and FIG. 4, the end covering member 140 is disposed along the right and left edges of the laminated panel 100 (Note that FIG. 3 and FIG. 4 show an example in which the end covering member 140 is disposed only on the left side of the laminated panel 100). The end of the laminated panel 100 is fitted into the holding portion 142 until it abuts on the groove portion 141 of the end covering member 140, and held by the groove portion 141 of the end covering member 140. The end covering member 140 is a mating part for the laminated panel 100.

The end covering member 140 disposed along the edge of the laminated panel 100 and including the holding portion 142 which holds the end of the laminated panel 100 is provided, thereby allowing a load transmitted via the laminated panel 100 to the structural material 130 to be transmitted to and dispersed on the end covering member 140, thus making it possible to improve rigidity and strength of the laminated panel 100.

Hereinafter, description will be given of the operation and effects of the laminated panel 100 configured as described above.

Comparison of Present Embodiment with Comparative Examples

First, description will be given of comparative examples of the laminated panel according to the present embodiment.

Figure 5A:
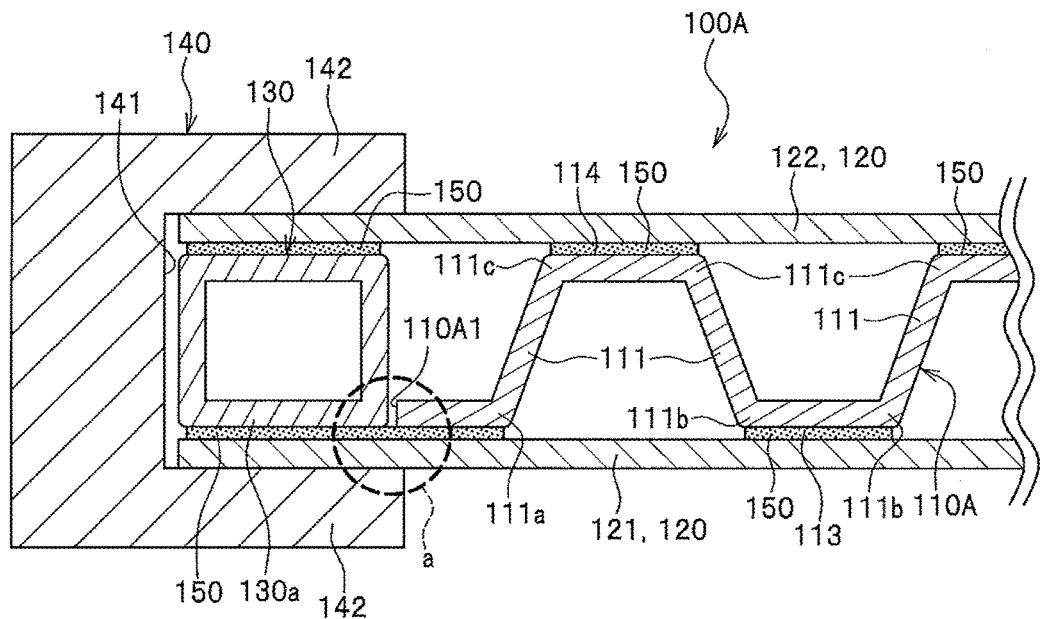
FIG. 5A is an explanatory view of a comparative example 1 of the laminated panel according to the first embodiment of the present invention.

As shown in FIG. 5A, a laminated structure 100A of a comparative example 1 is provided with a corrugated plate 110A which is a core material, the pair of face plates 120 (121, 122) which sandwich the corrugated plate 110A from both sides (upper and lower sides), and the structural material 130 which reinforces the laminated structure 100A. The structural material 130 is disposed in a cut-out portion 110A1 at which a portion of the corrugated plate 110A (portion for use in disposing the structural material 130) is cut out.

Thus, since the comparative example 1 allows the structural material 130 to be disposed in the cut-out portion 110A1 of the corrugated plate 110A, only one face plate 121 exists between the cut-out portion 110A1 and the structural material 130 as shown in a circle a indicated by a dashed line in FIG. 5A, thus leading to low strength and low rigidity. More specifically, the portion shown in the circle a indicated by the dashed line in FIG. 5A, in which only one face plate 121 exists between the cut-out portion 110A1 and the structural material 130, does not contribute to overall reinforcement of the laminated structure 100A, and further causes a problem in that a shearing stress concentrates on the portion between the cut-out portion 110A1 and the structural material 130 to form the origin of deformation.

Figure 5B:
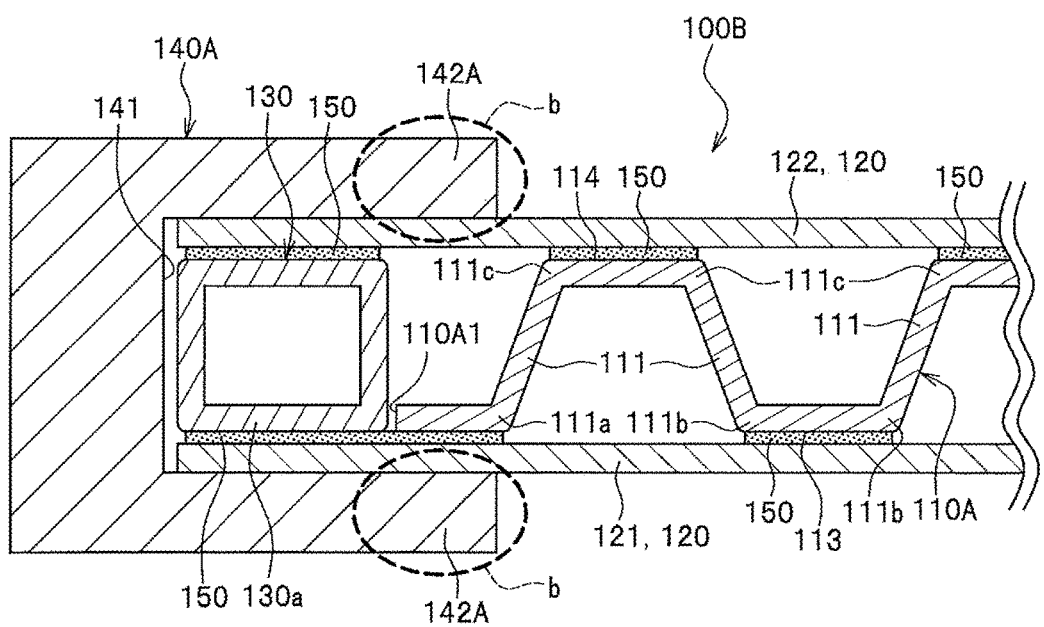
FIG. 5B is an explanatory view of a comparative example 2 of the laminated panel according to the first embodiment of the present invention.

In order to avoid this disadvantage, a structure such as shown in FIG. 5B is conceived in which a holding portion 142A of an end covering member 140A is made longer. As shown in FIG. 5B, a laminated structure 100B of a comparative example 2 allows an end portion of the laminated structure 100B to be held by the holding portion 142A of the end covering member 140A. The holding portion 142A of the end covering member 140A extends inward of the face plate 120 so as to be longer than the holding portion 142 of the end covering member 140 in FIG. 5A and to cover the portion between the cut-out portion 110A1 and the structural material 130.

As shown in a circle b indicated by a dashed line in FIG. 5B, the comparative example 2 allows the holding portion 142A of the end covering member 140A holding the end portion of the laminated structure 100B to be extended, thus making it possible to reinforce the region on which the stress concentrates, shown in the circle a indicated by the dashed line in FIG. 5A, on which the stress concentrates. However, a region on the face plate 120 (121, 122) which is not held by the holding portion 142A (i.e., available region of the face plate 120) is reduced in area, and where the laminated structure 100B is used as the slope 50, an effective area of the portion to be a loading platform is decreased.

As shown in FIG. 3 and FIG. 4, the laminated panel 100 according to the present embodiment is configured so that the structural material 130 is disposed between the pair of face plates 120 (121, 122) and the flange 112 of the core panel 110 is sandwiched between the structural material 130 and one face plate 121. That is, the flange 112 of the core panel 110 is laid to envelop the bottom portion of the rectangular cross-section portion 130a of the structural material 130. This allows the core panel 110 to exist at the boundary between the core panel 110 and the structural material 130 (In other words, there is no gap at the boundary between the core panel 110 and the structural material 130 in the width direction of the laminated panel 100). That is, the core panel 110 can be provided all over the surface in the width direction of the laminated panel 100. Moreover, although not illustrated, the flange 112 of the core panel 110 is configured to be sandwiched between the rectangular cross-section portion 130a of the structural material 130 and one faceplate 121, thereby making it possible to provide the core panel 110 all over the surface in a direction perpendicular to the width direction of the laminated panel 100.

Therefore, the laminated panel 100 according to the present embodiment makes it possible, as compared to the comparative example 1 (FIG. 5A), to eliminate regions having locally low strength and low rigidity and thus to suppress stress concentration to improve rigidity and strength of the laminated panel 100.

Moreover, the laminated panel 100 according to the present embodiment makes it unnecessary to extend the holding portion 142 of the end covering member 140 toward the center of the panel for the purpose of reinforcing the regions having low strength and low rigidity as in the comparative example 2 (FIG. 5B), and accordingly, the available region of the face plate 120 is not decreased in area. Where the laminated panel 100 according to the present embodiment is utilized as the slope 50, a loading platform in which the available region of the face plate 120 is maximally extended can be obtained.

[Arrangement of Structural Materials and Flanges]

The laminated panel 100 according to the present embodiment allows the flange 112 to be provided in the core panel 110 sandwiched between the pair of face plates 120 (121, 122) and allows the rectangular cross-section portion 130a of the structural material 130 to be disposed between the flange 112 and the other face plate 122. Where the laminated panel 100 is applied to a panel on which an object to be mounted can be mounted (e.g., a panel constituting the slope 50 shown in FIG. 1), a compressive stress and a tensile stress such as shown in FIGS. 6A and 6B are generated relative to a force exerted on a mounting surface of the object to be mounted. For this reason, when the laminated panel 100 is placed in the present embodiment, a front side and a back side thereof are distinctively used.

First, as shown in FIG. 6A, description will be given of a case where the laminated panel 100 is placed so as to dispose the flange 112 of the core panel 110 on the side of the surface (face plate 521) of the laminated panel 100 on which the object to be mounted is mounted. The case of FIG. 6A corresponds to a case where the laminated panel 100 according to the present embodiment is placed with the front side and the back side inversely turned over.

When a load F is applied to the face plate 521 in a direction perpendicular to the surface as indicated by a thick arrow in FIG. 6A, a compressive stress is applied to the surface (face plate 521) which forms a loading platform, and a tensile stress is applied to the opposite surface (face plate 522). The face plate generally has a lower bearing force relative to the tensile stress than relative to the compressive stress. In the case of FIG. 6A, the panel is more fragile relative to the tensile stress applied to the face plate 522 than relative to the compressive stress applied to the face plate 521. More specifically, as for regions of the face plate 522 which are other than the joining regions via the adhesive 150 between the face plate 522 and the structural material 130 and the second flat portion 114 of the core panel 110, the face plate 522 itself has to accept the tensile stress, leading to a risk of deformation and/or fracture. In particular, as shown in a circle c indicated by a dashed line in FIG. 6A, the region of the face plate 522 between the joining region of the structural material 130 in the end of the laminated panel 100 and the face plate 522 and the joining region of the second flat portion 114 of the core panel 110 and the face plate 522 receives the tensile stress more intensively, allowing deformation and/or fracture to be feared.

To cope with this disadvantage, in the present embodiment as shown in FIG. 6B, where the laminated panel 100 is used in a panel on which an object to be mounted can be mounted, the laminated panel 100 is arranged so as to dispose the flange 112 of the core panel 110 on the side of the surface (one face plate 121) opposite to the surface (the other face plate 122) of the laminated panel 100 on which the object to be mounted is mounted. That is, the laminated panel 100 is placed so as to allow the flange 112 of the core panel 110 to be sandwiched between the face plate on the side opposite to the surface of the laminated panel 100 on which the object to be mounted is mounted, and the rectangular cross-section portion 130a of the structural material 130.

Thus, the laminated panel 100 according to the present embodiment allows the flange 112 of the core panel 110 to be disposed on the side of one face plate 121 to which the tensile stress is applied, and allows the flange 112 to be sandwiched between the rectangular cross-section portion 130a of the structural material 130 and one face plate 121, thereby making it possible to improve a bearing force relative to the tensile stress.

Note that, although the above description is given, taking a load (force in the vertical direction) for example, and thus the top face of the laminated panel 100 is defined as a face which forms a loading platform and the bottom face is defined as a face on which a tensile stress is generated, the force in the vertical direction is not limited to the load. That is, any form may be adopted as long as the laminated panel 100 is placed so as to allow a face which receives an external force F to generate a tensile stress, to be one face plate 121. For example, where the laminated panel 100 according to the present embodiment is used in use application such as receiving an external force F directed upward from below, the laminated panel 100 is arranged so as to allow a face on which a tensile stress is generated (i.e., face plate on the outer side), to be one face plate 121.

As described above, the laminated panel 100 according to the present embodiment includes the core panel 110 having the vertical wall portion 111 which extends in a direction which intersects with the panel surface; the pair of face plates 120 (121, 122) which sandwich the core panel 110 from both sides; and the structural material 130 in which the rectangular cross-section portion 130a which sandwiches the flange 112 of the core panel 110, formed to extend along one face plate 121 from the end portion 111a of the vertical wall portion 111, between the rectangular cross-section portion 130a and one face plate 121 is disposed, and is configured to allow the flange 112 of the core panel 110 to be interposed between the structural material 130 and one face plate 121.

This configuration allows the core panel 110 to exist at the boundary between the core panel 110 and the structural material 130, and thus the core panel 110 can be provided all over the surface of the laminated panel 100. Accordingly, as compared to the comparative example 1 shown in FIG. 5A, it is possible to eliminate regions having locally low strength and low rigidity and thus to suppress stress concentration to improve rigidity and strength of the laminated panel 100. Moreover, it is unnecessary to provide an extension portion of the end covering member 140 for the purpose of reinforcing the regions having low strength and low rigidity as in the comparative example 2 shown in FIG. 5B. Consequently, the available region of the face plate is not decreased in area, and where the laminated panel 100 is utilized as the slope 50, the loading platform in which the available region of the face plate is maximally extended can be obtained.

Modified Examples

Next, description will be given of modified examples of the structural material in the laminated panel according to the present embodiment.

<Structural Material: Rectangular Block Component>

A laminated panel 101 shown in FIG. 7 is provided with a structural material 131 disposed on a peripheral edge (at right and left ends in this example) of the laminated panel.

The structural material 131 is composed of a plurality of rectangular block components, and the structural material 131 composed of the rectangular block components includes a rectangular cross-section portion 131a. The laminated panel 101 including the structural material 131 has a structure similar to that of the laminated panel 100 shown in FIG. 3 and FIG. 4, in which the flange 112 of the core panel 110 is sandwiched between, and joined via the adhesive (not shown) to, the rectangular cross-section portion 131a of the structural material 131 and one face plate 121.

<Structural Material: Protruding Portion>

Figure 8:
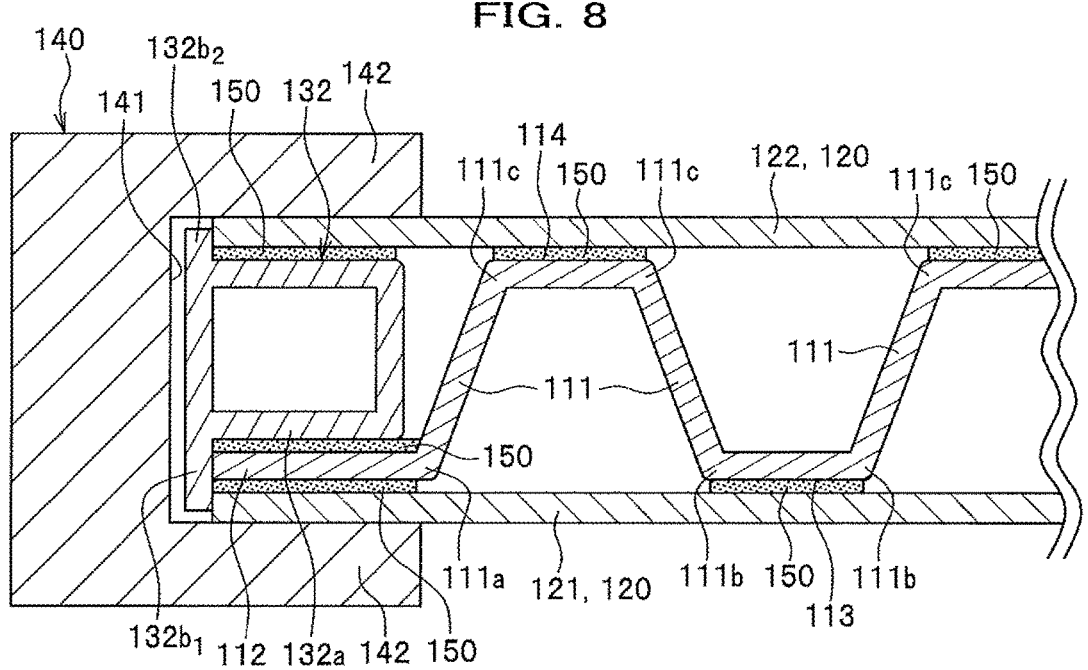
FIG. 8 is a cross-section view showing another modified example of the structural material in the laminated panel according to the first embodiment of the present invention.

A laminated panel 102 shown in FIG. 8 is provided with a structural material 132 disposed on a peripheral edge (at right and left ends in this example) of the laminated panel.

The structural material 132 is provided with a rectangular cross-section portion 132a sandwiched between the flange 112 of the core panel 110 and the other face plate 122, a protruding portion $132b_1$ which projects from the rectangular cross-section portion 132a in a direction which intersects with one face plate 121, to abut on an end of one face plate 121 to be locked, and a protruding portion $132b_2$ which projects from the rectangular cross-section portion 132a in a direction which intersects with the other face plate 122, to abut on an end of the other face plate 122 to be locked, The laminated panel 102 including the structural material 132 has a structure in which the flange 112 of the core panel 110 is sandwiched between, and joined via the adhesive 150 to, the rectangular cross-section portion 132a of the structural material 132 and one face plate 121.

The protruding portion $132b_1$ has a longer protrusion height than the protruding portion $132b_2$ by a length required for sandwiching the flange 112 of the core panel 110 between the rectangular cross-section portion 132a of the structural material 132 and one face plate 121.

The protruding portions $132b_1$, $132b_2$ of the structural material 132 are allowed to abut on the ends of the pair of face plates 120 (121, 122) to be locked, thereby making it possible to carry out positioning of the structural material 132 relative to the pair of face plates 120 (121, 122) of the laminated panel 102 and thus to increase ease of assembly. Moreover, the structural material 132 can be positioned with high accuracy and thus the structural material 132 can be arranged with high accuracy on a region requiring a certain rigidity and strength.

<Structural Material: Protrusion Height of Protruding Portion>

Figure 9:
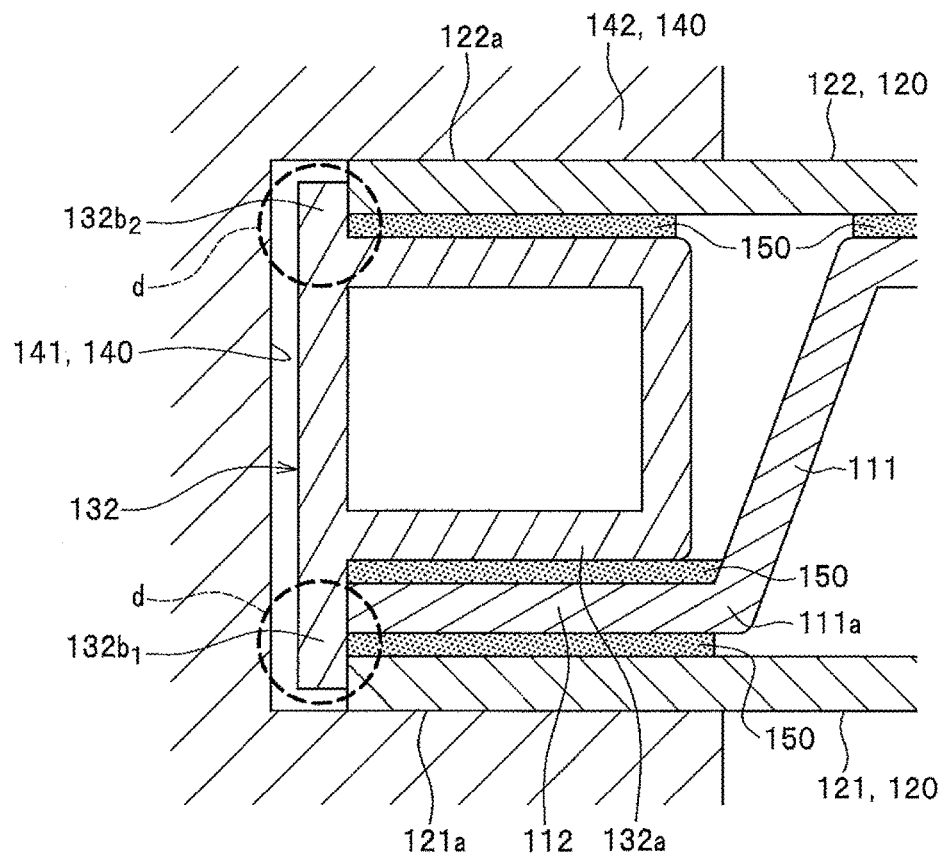
FIG. 9 is an enlarged view of a main part in FIG. 8.

As shown in a circle d indicated by a dashed line in FIG. 9, protrusion heights of the protruding portions $132b_1$, $132b_2$ of the structural material 132 are set to be smaller than a plate thickness of the pair of face plates 120 (121, 122), respectively. More specifically, the protrusion height of the protruding portion $132b_1$ of the structural material 132 is set to be smaller than a length from the rectangular cross-section portion 132a to an outer surface 121a of one face plate 121. Accordingly, the protruding portion $132b_1$ of the structural material 132 does not protrude beyond the outer surface 121a of one face plate 121 and thus the protruding portion $132b_1$ does not abut on an inner wall of the holding portion 142 of the end covering member 140. Similarly, the protrusion height of the protruding portion $132b_2$ of the structural material 132 is set to be smaller than a length from the rectangular cross-section portion 132a to an outer surface 122a of the other face plate 122. Accordingly, the protruding portion $132b_2$ of the structural material 132 does not protrude beyond the outer surface 122a of the other face plate 122 and thus the protruding portion $132b_2$ does not abut on the inner wall of the holding portion 142 of the end covering member 140.

Herein, where the protruding portions $132b_1$, $132b_2$ of the structural material 132 are set to be thicker than the plate thickness of the pair of face plates 120 (121, 122), they protrude from the outer surfaces of the face plates 120 (surfaces on the side opposite to the surfaces facing the core panel 110), and when receiving a load, the load is first applied to the protruding portions $132b_1$, $132b_2$, not to the face plates 120. This causes the stress to concentrate on the protruding portions $132b_1$, $132b_2$. On the other hand, the protruding portions $132b_1$, $132b_2$ are set to be smaller than the plate thickness of the face plates 120, allowing the protruding portions $132b_1$, $132b_2$ to be set so as not to protrude from the outer surfaces of the face plates 120, thereby making it possible to receive the load dispersedly on the face plates and thus to suppress stress concentration.

Moreover, where the end of the laminated panel 102 is held by the end covering member 140 (see FIG. 3), the protruding portions $132b_1$, $132b_2$ do not become obstacles, thus making it possible to reliably hold the face plates 120 by the holding portion 142 of the end covering member 140.

<Bonding of Structural Material to Face Plate>

Next, description will be given of an example of bonding of the structural material 130 to the pair of face plates 120 (121, 122). Herein, "bonding" in the present invention is a concept including any of adhesion, fastening and joining.

Figure 10:
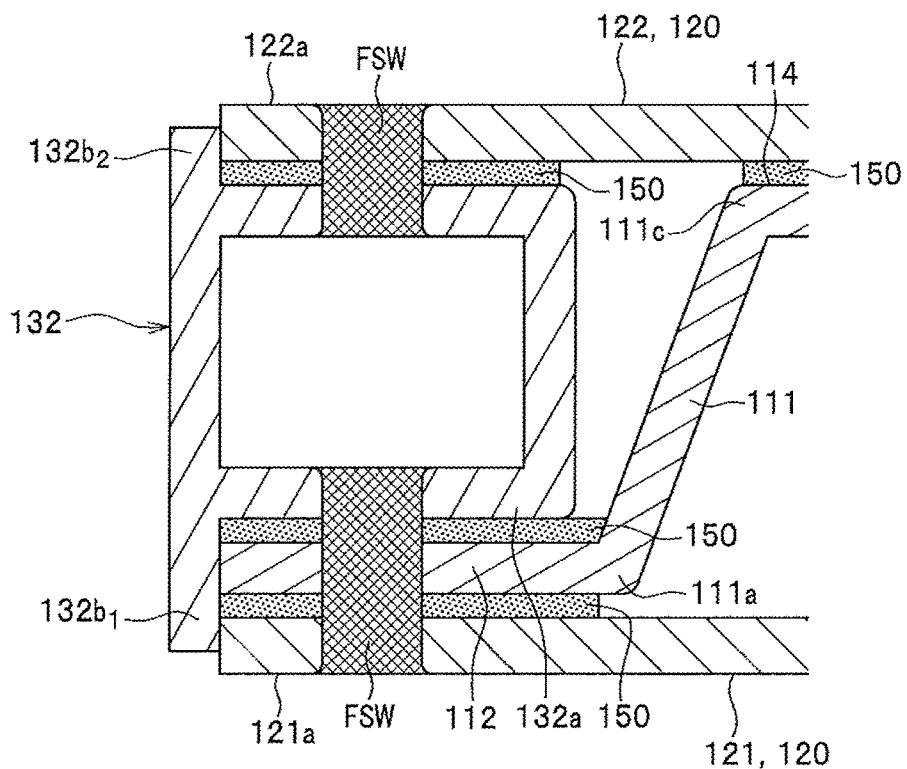
FIG. 10 is a cross-section view showing one example of joining of the structural material to face plates in the laminated panel according to the first embodiment of the present invention.

FIG. 10 is an explanatory view of an example of friction stir welding (FSW).

As shown in FIG. 10, as an example of bonding, the structural material 132 is joined to the pair of face plates 120 (121, 122) by means of friction stir welding (FSW). The example of FIG. 10 employs adhesion by the adhesive 150 of the structural material 132, the pair of face plates 120 (121, 122) and the flange 112 of the core panel 110, and FSW (see hatched portions in FIG. 10). The above adhesion is carried out by bonding with the structural adhesive 150 interposed between the structural material 132, the pair of face plates 120 (121, 122) and the flange 112 of the core panel 110.

Figure 11:
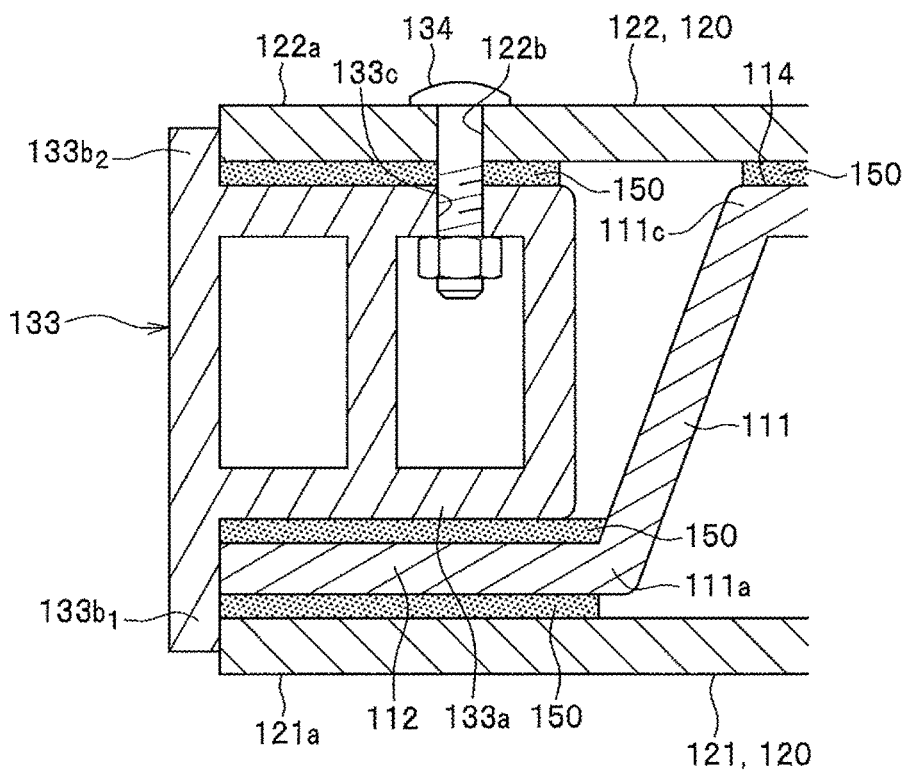
FIG. 11 is a cross-section view showing another example of joining of the structural material to the face plates in the laminated panel according to the first embodiment of the present invention.

FIG. 11 is an explanatory view of an example of fastening. As shown in FIG. 11, a structural material 133 is provided with a rectangular cross-section portion 133a sandwiched between the flange 112 of the core panel 110 and the other face plate 122, a protruding portion $133b_1$ which projects from the rectangular cross-section portion 133a in a direction which intersects with one face plate 121, to abut on the end of one face plate 121 to be locked, a protruding portion $133b_2$ which projects from the rectangular cross-section portion 133a in a direction which intersects with the other face plate 122, to abut on the end of the other face plate 122 to be locked, and a through-hole 133c which penetrates into the cross-section of the structural material 133.

The protruding portion $133b_1$ has a longer protrusion height than the protruding portion $133b_2$ by a length required for sandwiching the flange 112 of the core panel 110 between the rectangular cross-section portion 133a of the structural material 133 and one face plate 121.

Moreover, a through-hole 122b is formed in the other faceplate 122 which faces the through-hole 133c of the structural material 133. Note that a length of the flange 112 of the core panel 110 corresponds to a length of the rectangular cross-section portion 133a of the structural material 133.

As shown in FIG. 11, the structural material 133, the pair of face plates 120 (121, 122) and the flange 112 of the core panel 110 are first bonded via the adhesive 150 to each other. Then, as an example of fastening, a fastening member 134 such as a blind rivet is fitted into the through-hole 122b of the other face plate 122 and the through-hole 133c of the structural material 133, and the structural material 133 and the other face plate 122 are fastened by the fastening member 134.

In this way, the structural material 133 is bonded (joined, made adhere, or fastened) to the face plates, thereby making it possible to suppress positional misalignment of the structural material 133 relative to the face plates and thus to fix the structural material 133 onto a region requiring a certain rigidity and strength.

<Structural Material: Exposed Portion>

Next, description will be given of examples in which the structural material is exposed on the end portions of the pair of face plates 120 (121, 122). Examples of the structural material being exposed on the end portions of the pair of face plates 120 (121, 122) include, for example, (1) a case where the structural material constitutes a hinge portion which rotatably connects a plurality of laminated panels to each other, and (2) a case where the structural material constitutes an attachment component such as an inclined plate which is attached to the end portions of the pair of face plates 120 (121, 122).

Figure 12:
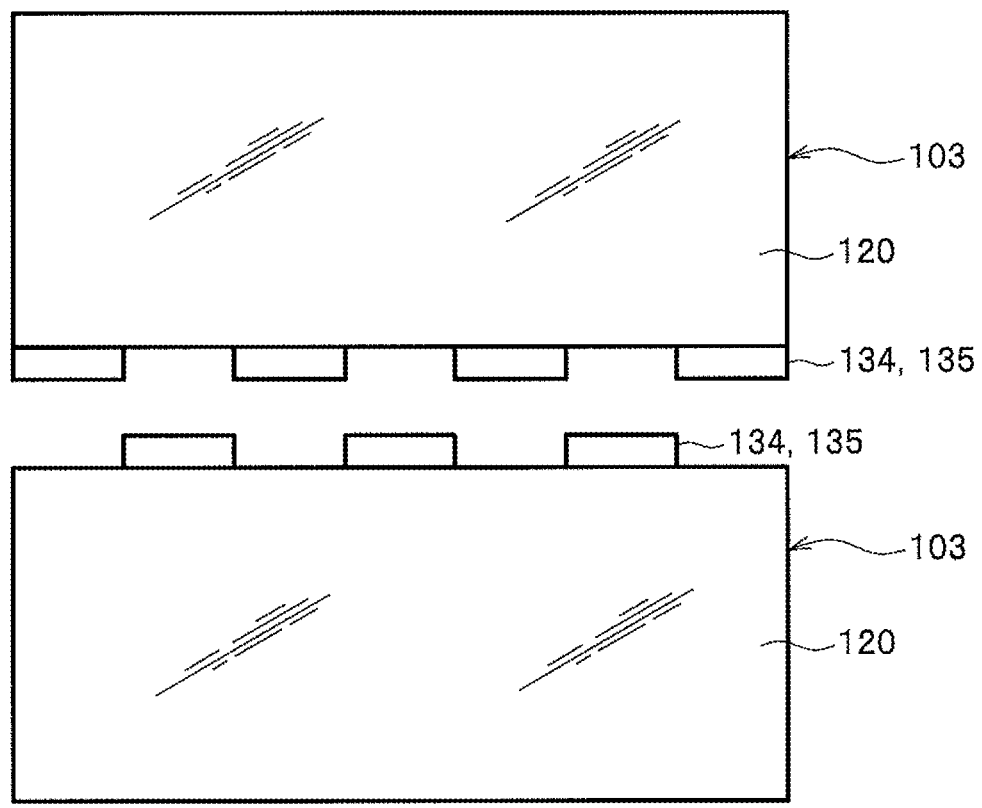
FIG. 12 is a plan view showing a combination of laminated panels for the case of an exposed portion of the structural material in the laminated panel according to the first embodiment of the present invention being a hinge portion.

(1) Case where an Exposed Portion of the Structural Material Constitutes a Hinge Portion As shown in FIG. 12, laminated panels 103, 103 are each provided with a structural material 134 which is exposed on an upper end portion or a lower end portion of the face plate 120. Respective structural materials 134, 134 have a hinge portion 135 as described later, and the laminated panels 103, 103 are rotatably connected to each other through respective hinge portions 135, 135. The hinge portion 135 of the laminated panel 103 on the upper side and the hinge portion 135 of the laminated panel 103 on the lower side are alternatingly combined with each other.

Figure 13:
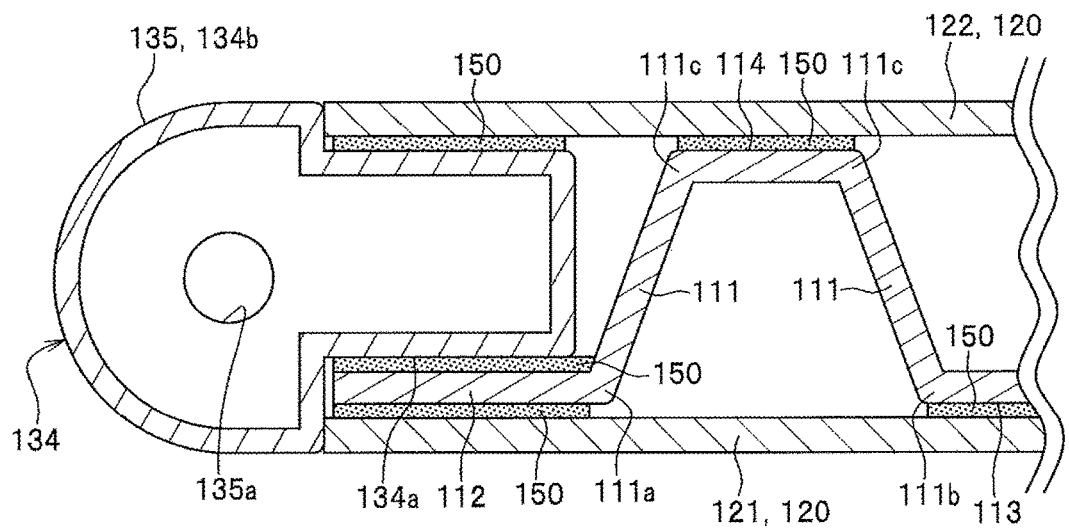
FIG. 13 is a cross-section view of a main part for the case of the exposed portion of the structural material in the laminated panel according to the first embodiment of the present invention being the hinge portion.

Of the laminated panels 103, 103 shown in FIG. 12, for example, the laminated panel 103 on the upper side is shown in FIG. 13. As shown in FIG. 13, the laminated panel 103 is mainly provided with the core panel 110 having the vertical wall portion 111 which extends in a direction which intersects with the panel surface; the pair of face plates 120 (121, 122) which sandwich the core panel 110 from both sides; and the structural material 134 which is exposed on the end portions of the pair of face plates 120 (121, 122).

The structural material 134 is composed of, for example, a hollow pipe, and includes a rectangular cross-section portion 134*a* which is disposed between the flange 112 of the core panel 110 and the other face plate 122, and an exposed portion 134*b* which extends in a direction along the surfaces of the pair of face plates 120 (121, 122) and is exposed on the end portions of the pair of face plates 120 (121, 122) so as to cover the end portions. Joining portions of the end portions of the face plates 120 (121, 122) and the exposed portion 134*b* are formed so as not to have a difference in level.

Note that the core panel 110 of the laminated panel 103 shown in FIG. 13 is different from the core panel 110 of the laminated panel 100 shown in FIG. 3 and FIG. 4, in the direction of array of ripples of the corrugated plate. More specifically, the core panel 110 of the laminated panel 103 shown in FIG. 13 is the same as the core panel 110 of the laminated panel 100 shown in FIG. 3 and FIG. 4, in that it constitutes the corrugated plate in which the vertical wall portions 111, the first flat portions 113 and the second flat portions 114 form a continuous shape of a trapezoid in cross-sectional view. However, the core panel 110 of the laminated panel 100 shown in FIG. 3 and FIG. 4 allows the vertical wall portions 111 to be on the up-down direction (direction along the end covering member 140 (see FIG. 3)), while on the other hand, the core panel 110 of the laminated panel 103 shown in FIG. 13 allows the vertical wall portions 111 of the core panel 110 to be on the right-left direction (width direction perpendicular to the end covering member 140) and differs in this respect from the core panel 110 of the laminated panel 100.

Figure 14:
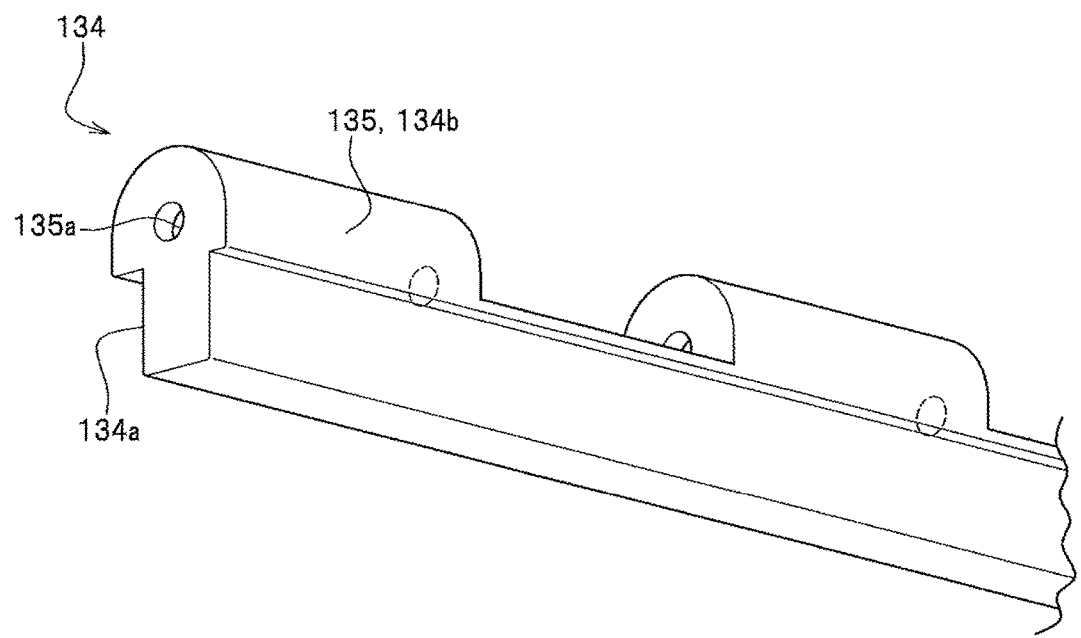
FIG. 14 is a perspective view of the hinge portion for the case of the exposed portion of the structural material in the laminated panel according to the first embodiment of the present invention being the hinge portion.

As shown in FIG. 14, the exposed portion 134*b* of the structural material 134 forms the hinge portion 135 which allows the laminated panel 103 to be rotatably and pivotally supported. Each of the hinge portions 135 is spaced from each other. The hinge portion 135 has a through-hole 135*a* formed therein through which a shaft member (not shown) is allowed to pass.

In the above configuration, as shown in FIG. 12, the hinge portion 135 which is the exposed portion 134*b* of the structural material 134 of the laminated panel 103 on the upper side and the hinge portion 135 of the structural material 134 of the laminated panel 103 on the lower side are combined with each other, and the shaft member (not shown) is allowed to pass through the respective through-holes 135*a* of the combined hinge portions 135, thereby rotatably and pivotally supporting the laminated panel 103 on the upper side and the laminated panel 103 on the lower side through the respective hinge portions 135.

Thus, the exposed portion 134*b* of the structural material 134 constitutes the hinge portion 135, thereby making it possible, for example, when the laminated panel 103 is used as a loading platform of the slope 50 (see FIG. 1), to readily provide the hinge portion 135 on the slope 50 and thus to improve usefulness of the laminated panel 103.

Moreover, although not illustrated, the exposed portion 134*b* of the structural material 134 may constitute a component attachment portion to which a specific component such as a motor-driven winch instead of the hinge portion 135 is attached. The exposed portion 134*b* of the structural material 134 constitutes the component attachment portion, thereby making it possible to attach various components to the component attachment portion, or to attach the laminated panel 103 per se to a body component or the like, and thus to improve usefulness of the laminated panel 103.

Note that one or more hinge portions 135 and one or more component attachment portions other than the hinge portions 135 may be provided. Moreover, the exposed portion 134*b* of the structural material 134 may be arranged at any location. In other words, in order to arrange the exposed portion 134*b* of the structural material 134 at a desired location, configuration of the structural material 134 and the flange 112 (see FIG. 13) of the core panel 110 is determined.

Figure 15:
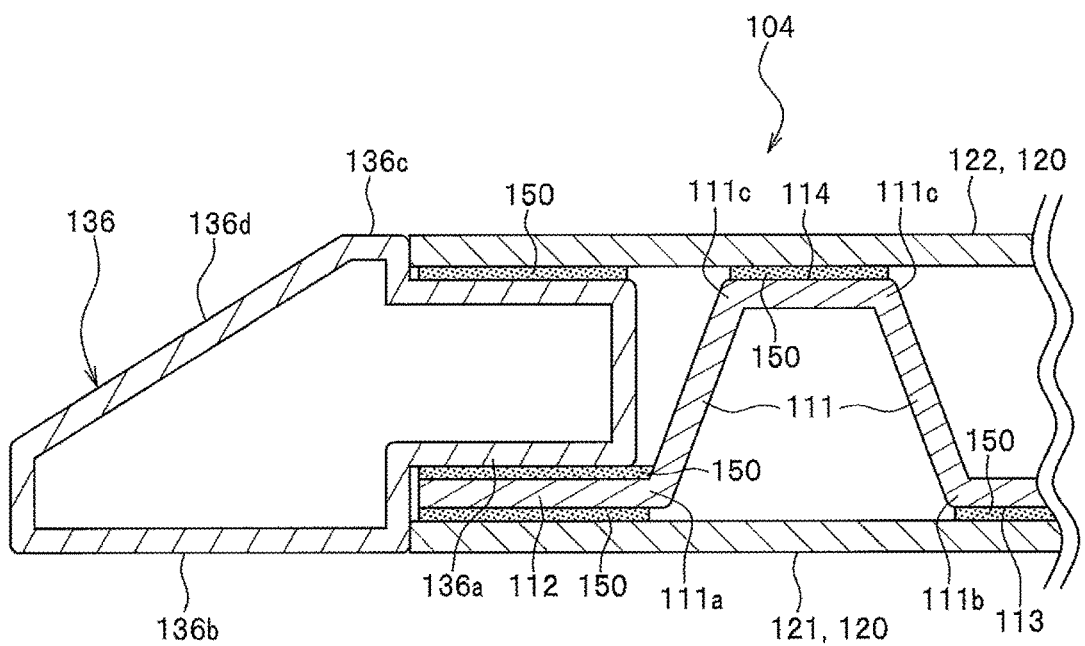
FIG. 15 is a cross-section view of a main part for the case of the exposed portion of the structural material in the laminated panel according to the first embodiment of the present invention being an inclination portion.

(2) Case where an Exposed Portion of the Structural Material Constitutes an Attachment Component As shown in FIG. 15, a structural material 136 may constitute an attachment component such as an inclined plate which is attached to the end portions of the pair of face plates 120 (121, 122).

The laminated panel 104 shown in FIG. 15 is applied to the lower stage slope of the slope 50 (see FIG. 1). The laminated panel 104 is mainly provided with the core panel 110 having the vertical wall portion 111 which extends in a direction which intersects with the panel surface; the pair of face plates 120 (121, 122) which sandwich the core panel 110 from both sides; and the structural material 136 which is exposed on the end portions of the pair of face plates 120 (121, 122).

The structural material 136 is composed of, for example, a hollow pipe, and includes a rectangular cross-section portion 136*a* which is disposed between the flange 112 of the core panel 110 and the other face plate 122, and an exposed portion 136*b* which extends in a direction along the surfaces of the pair of face plates 120 (121, 122) and is exposed on the end portions of the pair of face plates 120 (121, 122). The exposed portion 136*b* includes a flat portion 136*c* which extends outwardly from the end portion of the other face plate 122, and an inclination portion 136*d* which is inclined from a leading end portion of the exposed portion 136*b* to an end portion of the flat portion 136*c*. Joining portions of the end portions of the face plates 120 (121, 122) and the exposed portion 136*b* are formed so as not to have a difference in level.

Note that the core panel 110 of the laminated panel 104 shown in FIG. 15 employs the configuration in which the vertical wall portions 111 of the core panel 110 are on the right-left direction (width direction perpendicular to the end covering member 140 (see FIG. 3)), as in the core panel 110 of the laminated panel 103 shown in FIG. 13. Moreover, where the laminated panel 104 shown in FIG. 15 is applied to the lower stage slope 52 (see FIG. 1) of the slope 50 (see FIG. 1), the laminated panel 104 may adopt a configuration in which the structural material 136 having the inclination portion 136d is provided on a peripheral edge (lower edge) of the laminated panel 104 which contacts a road surface when the slope is expanded, and the structural material 134 having the hinge portion 135 is provided on a peripheral edge (upper edge) of the laminated panel 104 which is combined with the upper stage slope 51 (see FIG. 1) of the slope 50, respectively.

The laminated panel 104 makes it possible, for example, when used in the slope 50 (see FIG. 1), to reduce a difference in level between the laminated panel 104 and the ground with the help of the inclination portion 136d and thus to improve ease of mounting of an object (wheelchair) to be mounted.

Second Embodiment

Figure 16:
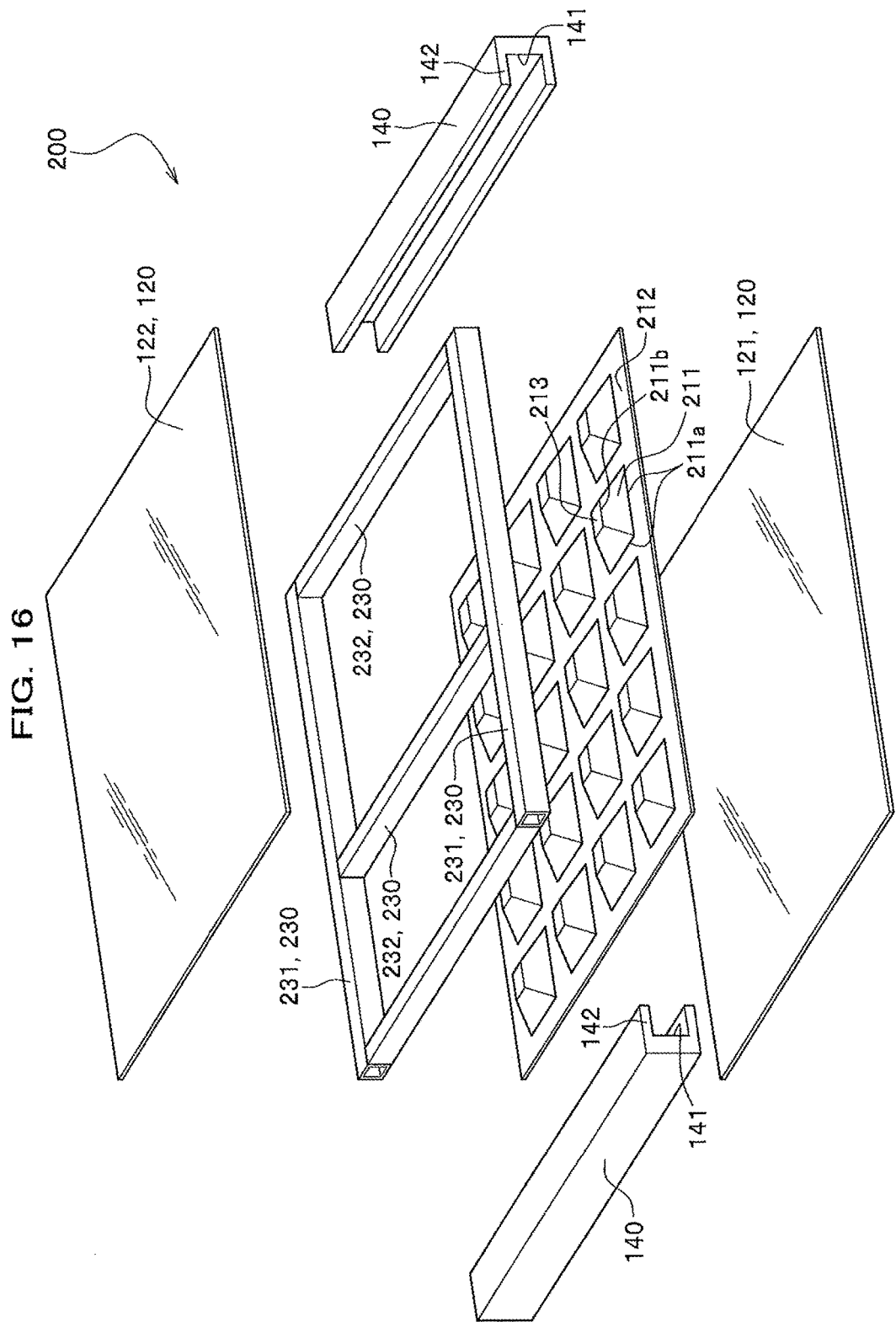
FIG. 16 is an exploded perspective view showing a configuration of a laminated panel according to a second embodiment of the present invention.
Figure 17:
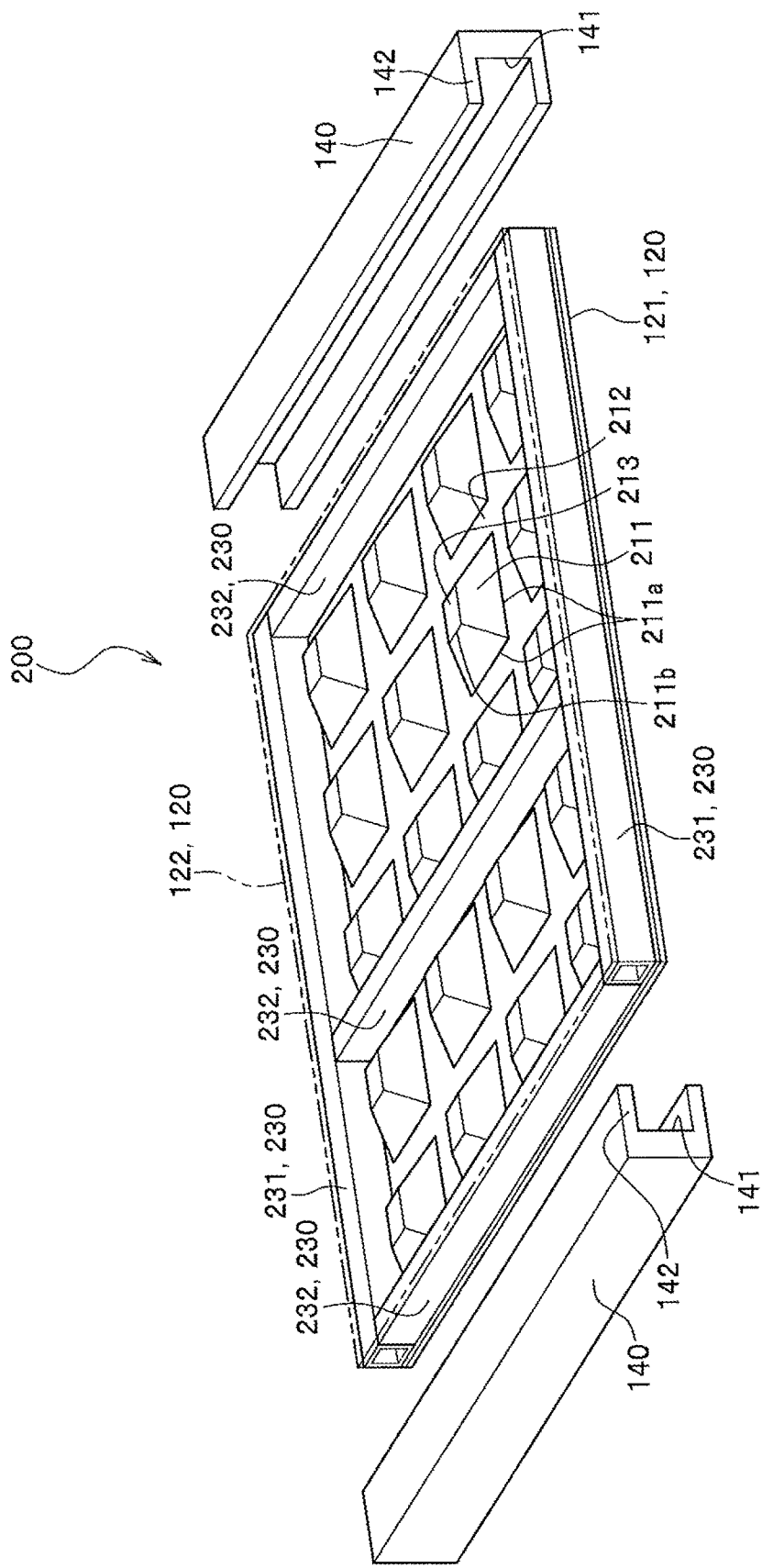
FIG. 17 is a perspective view showing the configuration of the laminated panel according to the second embodiment of the present invention.

As shown in FIG. 16 and FIG. 17, a laminated panel 200 according to a second embodiment of the present invention is mainly provided with a core panel 210 having a vertical wall portion 211 which extends in a direction which intersects with a panel surface, and a flat portion 212 (flat portion set forth in claim 1) which is formed to extend along the panel surface from an end portion 211a of the vertical wall portion 211; the pair of face plates 120 (121, 122) which sandwich the core panel 210 from both sides; and a structural material 230 in which a rectangular cross-section portion 230a which sandwiches the flat portion 212 of the core panel 210 between the rectangular cross-section portion 230a and one face plate 121 is disposed.

The structural material 230 is provided with peripheral edge structural materials 231, 231 which are disposed along a pair of opposing edge portions of a peripheral edge of the laminated panel 200, and connecting structural materials 232, 232, 232 which extend in a direction which intersects with the peripheral edge structural materials 231, 231.

Moreover, an end of the laminated panel 200 is held by the holding portion 142 of the end covering member 140 (end covering member), thereby allowing the end portion to be reinforced.

The laminated panel 200 can be used in, for example, the second slope 52 of the slope 50 (see FIG. 1).

<Core Panel>

The core panel 210 includes the vertical wall portion 211 having the form of a four-sided pyramid which extends in a direction which intersects with the pair of face plates 120 (121, 122), the flat portion 212 which is formed to extend along one face plate 121 from the end portion 211a of the vertical wall portion 211 to abut on the face plate 121, and a top flat portion 213 which is formed to face the other face plate 122 from another end portion 211b of the vertical wall portion 211. The flat portion 212 constitutes a flange of the vertical wall portion 211 at a peripheral edge of the core panel 210.

The core panel 210 is formed by press-working aluminum alloy by cold press.

As shown in FIG. 16, the core panel 210 is configured so as to allow convex portions each having the form of a four-sided pyramid to project from the flat portion 212 constituting bottoms of the convex portions, and to allow the convex portions to be arrayed in a matrix (herein, 4×5) in a plane.

The laminated panel 200 allows the vertical wall portion 211 to be formed to extend in the up-down direction of the laminated panel 200, thereby making it possible to improve rigidity and strength in the up-down direction of the laminated panel 200. Also, the flat portion 212 is formed at right and left end portions of the core panel 210, thereby making it possible to sandwich the flat portion 212 between the structural material 230 and the face plates 120.

Note that the core panel 210 may have any structure as long as it is provided with the flat portion 212 which is formed to extend along one face plate 121 from the end portion 211a of the vertical wall portion 211.

<Structural Material>

The structural material 230 is a reinforcing member for reinforcing corresponding regions of the laminated panel 200. The structural material 230 is disposed between the pair of face plates 120 (121, 122) and bonded to the pair of face plates 120 (121, 122). The structural material 230 includes the rectangular cross-section portion 230a, and the flat portion 212 of the core panel 210 is sandwiched between, and bonded via an adhesive (not shown) to, the rectangular cross-section portion 230a and one face plate 121.

The structural material 230 is a square pipe composed of, for example, a hollow aluminum alloy by extrusion. The structural material 230 may be solid, and the cross-section shape is not limited to the rectangular cross-section. Moreover, since the structural material 230 is a member for reinforcing the corresponding regions of the laminated panel 200, it is disposed close to the corresponding regions and has a shape and length according to the corresponding regions.

In the laminated panel 200 according to the present embodiment, the structural material 230 having the rectangular cross-section portion 230a disposed between the flat portion 212 of the core panel 210 and the pair of face plates 120 (121, 122) includes the peripheral edge structural materials 231, 231 which are disposed along the pair of opposing edge portions of the peripheral edge of the laminated panel 200, and the connecting structural materials 232, 232, 232 which extend in a direction which intersects with the peripheral edge structural materials 231, 231.

This configuration allows the core panel 210 to exist at the boundary between the core panel 210 and the structural material 230, as in the laminated panel 100 according to the first embodiment, and thus the core panel 210 can be provided all over the surface of the laminated panel 200 to obtain the same effects as those in the laminated panel 100.

Moreover, the laminated panel 200 according to the present embodiment allows the structural material 230 to include the peripheral edge structural materials 231 which are disposed along the pair of edge portions of the laminated panel 200, and the connecting structural materials 232 which connect the peripheral edge structural materials 231 with each other, thereby making it possible to improve surface rigidity of the laminated panel 200.

Also, in the present embodiment, at least one of the connecting structural material 232 and the peripheral edge structural material 231 is disposed to extend in the direction which intersects with the end covering member 140, and the end portion of the laminated panel 200 in the direction of extension is held by the holding portion 142 of the end covering member 140, thus making it possible to transmit and disperse a load transmitted via the laminated panel 200 to the structural material 230, to and on the end covering member 140, and to improve rigidity and strength of the laminated panel 200.

<Rail>

As shown in FIG. 16 and FIG. 17, the end covering member 140 includes the groove portion 141 on which the end (end portions of the face plates 120 and the structural material 230) of the laminated panel 200 abuts, and the holding portion 142 which holds the end of the laminated panel 200. The connecting structural material 232 and the peripheral edge structural material 231 are interposed between the end of the laminated panel 200 and the holding portion 142. This allows the holding portion 142 of the end covering member 140 to hold at least one of the connecting structural material 232 and the peripheral edge structural material 231. In the case of FIG. 16 and FIG. 17, the holding portion 142 of the end covering member 140 holds the connecting structural material 232.

This configuration makes it possible to transmit and disperse a load transmitted via the laminated panel 200 to the structural material 230, to and on the end covering member 140, and to improve rigidity and strength of the laminated panel 200.

[Arrangement of Component on Laminated Panel]

Figure 18:
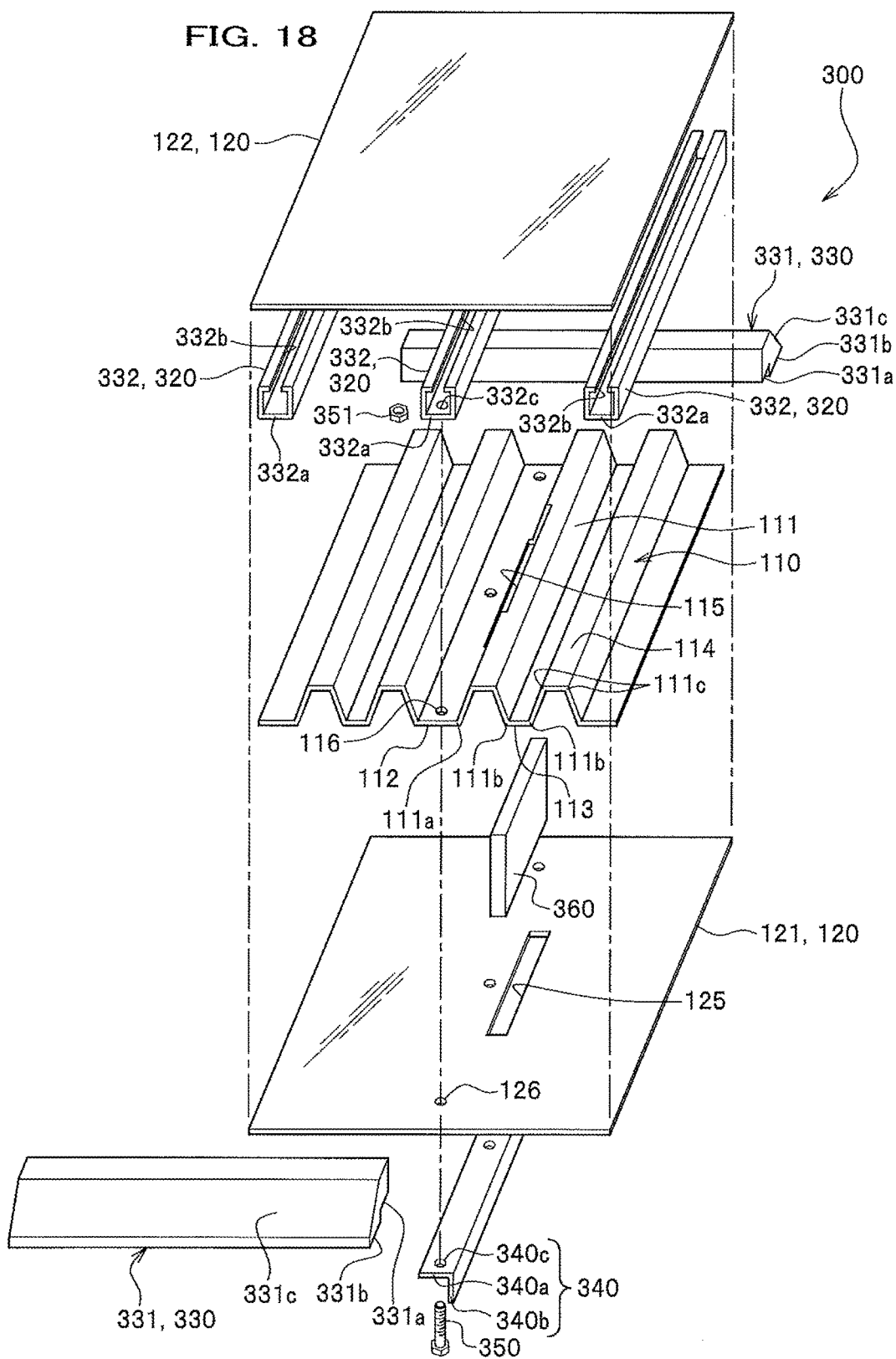
FIG. 18 is an exploded perspective view showing another configuration of the laminated panel according to the second embodiment of the present invention.
Figure 19:
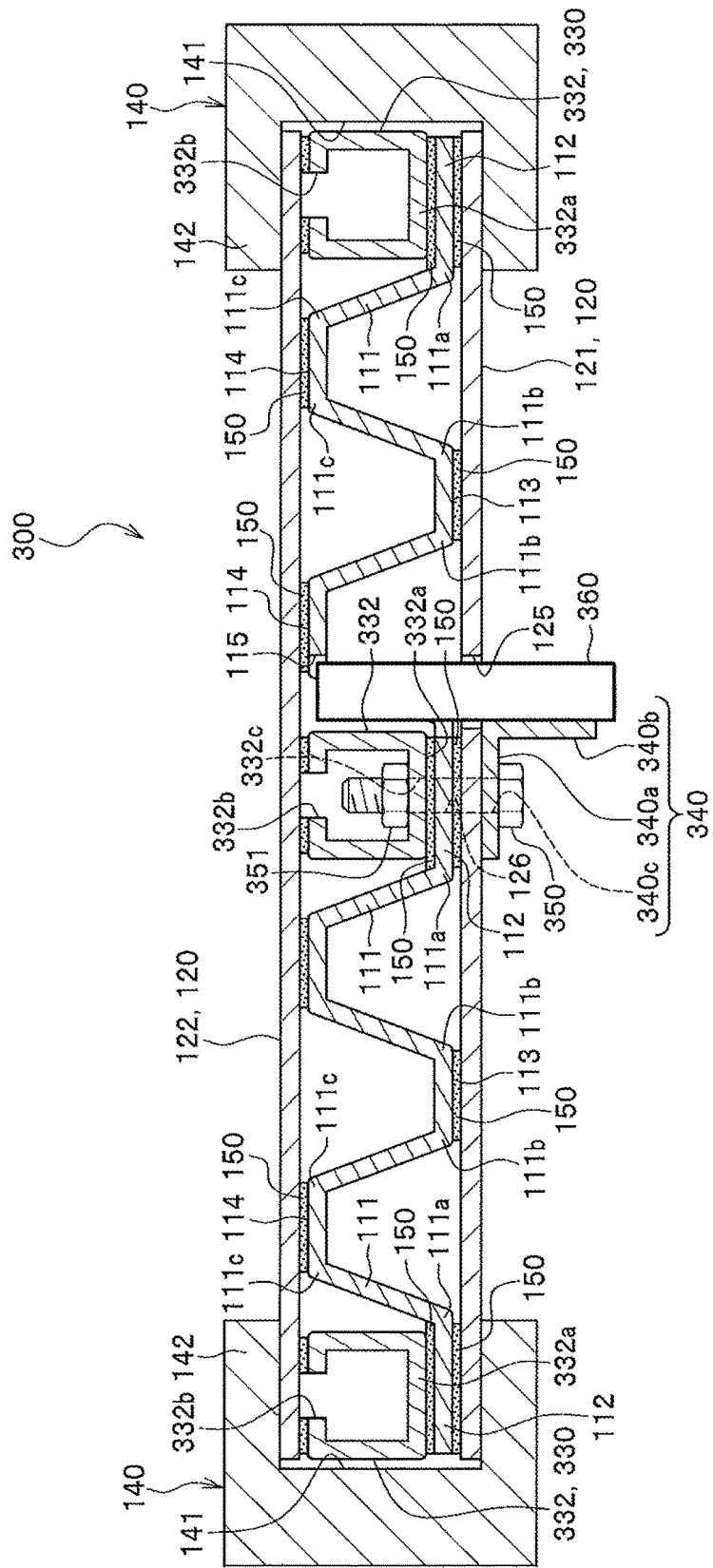
FIG. 19 is a perspective view showing another configuration of the laminated panel according to the second embodiment of the present invention.

As shown in FIG. 18 and FIG. 19, the laminated panel 300 is provided with a structural material 330 in which a rectangular cross-section portion 330a is disposed between the flange 112 of the core panel 110 (see FIG. 19) and the pair of face plates 120 (121, 122).

<Structural Material>

The structural material 330 is provided with peripheral edge structural materials 331 which are disposed along a pair of opposing edge portions of a peripheral edge of the laminated panel 300, and a plurality of (three in this example) connecting structural materials 332 which extend in a direction which intersects with the peripheral edge structural materials 331.

The peripheral edge structural material 331 is a structural material which is exposed on the outside of the end portions of the pair of face plates 120 (121, 122). The peripheral edge structural material 331 is composed of, for example, a hollow pipe, and includes a rectangular cross-section portion 331a which is disposed between the flange 112 of the core panel 110 and the other face plate 122, an exposed portion 331b which extends in a direction along the faces of the pair of face plates 120 (121, 122) and is exposed on the outside of the end portions of the pair of face plates 120 (121, 122), and an inclination portion 331c which is inclined from a leading end of the exposed portion 331b to an end portion of the other face plate 122.

The connecting structural material 332 includes a rectangular cross-section portion 332a, and an opening 332b which is opened on the opposite side of the rectangular cross-section portion 332a.

Of the plurality of connecting structural materials 332, the connecting structural material 332 disposed in the center of the laminated panel 300 includes a bolt through-part 332c for use in bolting a component attachment bracket 340 to the rectangular cross-section portion 332a. The bolt through-part 332c is formed into a slit in the longitudinal direction of the connecting structural material 332.

<Core Panel>

The core panel 110 includes an opening 115 for allowing a component 360 to be inserted therethrough, formed in the vertical wall portion 111 near the connecting structural material 332 disposed in the center of the laminated panel 300. The component 360 is a slope driving motor. As shown in FIG. 19, the opening 115 has the form of a rectangle and is opened to reach the end portion 111a on the flange 112 of the core panel 110.

Moreover, as shown in FIG. 19, the core panel 110 includes a bolt through-part 116 for use in bolting the component attachment bracket 340 to the flange 112, opened in the flange 112 which is sandwiched between the connecting structural material 332 disposed in the center of the laminated panel 300 and one face plate 121.

<Face Plate>

One face plate 121 includes an opening 125 for allowing the component 360 to be inserted therethrough, formed in a portion which is communicated with the opening 115 of the core panel 110. Moreover, one face plate 121 includes a bolt through-part 126 for use in bolting the component attachment bracket 340 to one face plate 121, opened in a portion facing the flange 112 which is sandwiched between the connecting structural material 332 disposed in the center of the laminated panel 300 and one face plate 121.

<Component Attachment Bracket>

Moreover, as shown in FIG. 19, the component attachment bracket 340 for attaching the component 360 thereto is disposed on an outer surface of one faceplate 121 (120) facing the connecting structural material 332 disposed in the center of the laminated panel 300. The component attachment bracket 340 is formed into an L-shape in section and includes an attachment face portion 340a for being attached to the panel surface, a supporting portion 340b for supporting the component 360 thereon, and a bolt through-part 340c opened in the attachment face portion 340a. The supporting portion 340b extends outwardly from the edge of the opening 125 of one face plate 121 and supports the component 360 inserted into the laminated panel 300, from the side surface of the component 360.

The bolt through-part 340c in the component attachment bracket 340, the bolt through-part 116 in the flange 112 of the core panel 110, the bolt through-part 126 in one face plate 121, and the bolt through-part 332c in the connecting structural material 332 are formed to have nearly the same diameter and coaxially arranged. Note that, although the bolt through-part 332c in the connecting structural material 332 has nearly the same diameter as the other bolt through-parts 340c and 116, it is formed into a slit in the longitudinal direction of the connecting structural material 332.

A bolt 350 is inserted into the bolt through-part 340c in the component attachment bracket 340, the bolt through-part 116 in the flange 112 of the core panel 110, the bolt through-part 126 in one face plate 121, and the bolt through-part 332c in the connecting structural material 332 which are coaxially arranged, and the bolt 350 is fastened together with a nut 351 located in the cross-section of the connecting structural material 332.

The component attachment bracket 340 can be directly bolted to the connecting structural material 332 and thus attachment rigidity and strength of the component attachment bracket 340 can be improved.

Thus, the core panel 110 and one face plate 121 include the opening 115 and the opening 125 for allowing the component 360 such as a slope driving motor to be inserted therethrough, formed near the connecting structural material 332 concerned. The component attachment bracket 340 is fastened together with the connecting structural material 332 concerned, the core panel 110 and one face plate 121, using the bolt 350 and the nut 351, with the component 360 being inserted through the openings 115 and 125, and is securely fixed to the laminated panel 300.

The component 360 is fixed through the component attachment bracket 340 to the laminated panel 300 with a portion of the component 360 being inserted, near the connecting structural material 332 which is attached to the core panel 110 and one faceplate 121. Since the portion of the component 360 is accommodated into the laminated panel 300 with the component 360 being fixed, the amount by which the component 360 projects from the laminated panel 300 can be reduced, allowing for compact storage of the component 360 and making it possible to secure attachment rigidity and strength of the component.

Moreover, the bolt through-part 332c in the connecting structural material 332 is formed into a slit in the longitudinal direction of the connecting structural material 332, thereby making it possible, as compared to a case where the bolt through-part 332c is formed into a hole, to easily align the bolt through-part 332c in the connecting structural material 332 with the bolt through-part 126 in one face plate 121 and the bolt through-part 340c in the component attachment bracket 340. Also, the bolt through-part 332c formed into a slit is provided along the longitudinal direction of the connecting structural material 332. Accordingly, where the connecting structural material 332 is formed by extrusion molding, the slit-shaped bolt through-part 332c can be formed simultaneously with the extrusion molding, thus facilitating the forming.

Herein, the bolt through-part 332c in the connecting structural material 332 may be provided at a plurality of locations at predetermined intervals in the longitudinal direction of the connecting structural material 332.

Connection by bolting can be carried out through the bolt through-part 332c at a position which corresponds to the bolt through-part 126 in one face plate 121, of the bolt through-parts 332c provided at the plurality of locations in the longitudinal direction of the connecting structural material 332, thus allowing the bolt through-part 332c to be easily aligned with the bolt through-part 126 in one face plate 121. Moreover, as compared to the case where the bolt through-part 332c is formed into a slit, the closed cross-section shape of the connecting structural material 332 can be maintained and thus rigidity and strength can be further secured.

Although the embodiments and their modified examples have been described above, the present invention is not limited to the above embodiments and their modified examples and thus appropriate modifications are possible within the range not departing from the gist of the present invention. For example, the laminated panel according to the embodiments is not limited to the case where it is applied to a slope. Also, even where the laminated panel is applied to a slope, the slope is not limited to a sliding one or a turning one. Moreover, the laminated panel is composed of an optional number of plates and may be composed of a single plate.

REFERENCE SIGNS LIST

1: Vehicle
2: Vehicle body
3: Back door
5: Vehicle body rear opening
6: Rear floor
50: Slope
51: First slope
52: Second slope
51b, 51b, 52b, 52b: Rail
100, 101, 102, 200, 300: Laminated panel
110, 210: Core panel
111, 211: Vertical wall portion
111a, 211a: End portion
111b: First bending portion
111c: Second bending portion
110: Core panel
112: Flange
113: First flat portion
114: Second flat portion
116, 126, 332c, 340c: Bolt through-part
120: Pair of face plates
121: One face plate
122: Other face plate
130, 131, 132, 133, 134, 136, 230, 330: Structural material
130a, 131a, 132a, 133a, 136a, 230a, 330a: Rectangular cross-section portion
132$b_1$, 132$b_2$: Protruding portion
133c, 135a: Through-hole
134a: Exposed portion
134b: Exposed portion
135: Hinge portion
136c: Inclination portion
140: End covering member
141: Groove portion
142: Holding portion
150: Adhesive
212: Flat portion
231, 331: Peripheral edge structural material
232, 332: Connecting structural material
332c: Bolt through-part
340: Component attachment bracket
350: Bolt
351: Nut
360: Component

The invention claimed is:
1. A laminated panel comprising:
a core panel having a vertical wall portion which extends in a direction which intersects with a panel surface, and a flat portion which is formed to extend along the panel surface from an end portion of the vertical wall portion;
a pair of face plates which sandwich the core panel from both sides; and
a structural material having a rectangular cross-section portion,
wherein, among the vertical wall portion and the flat portion of the core panel, only the flat portion of the core panel is sandwiched between the rectangular cross-section portion and one of the face plates,
the structural material including:
a peripheral edge structural material which is disposed along peripheral edges of the pair of face plates; and
a connecting structural material which extends in a direction which intersects with the peripheral edge structural material.
2. The laminated panel according to claim 1, further comprising
an end covering member having a holding portion which holds ends of the pair of face plates, wherein
at least one of the connecting structural material and the peripheral edge structural material is held by the holding portion of the end covering member.
3. The laminated panel according to claim 2, wherein
at least one of the connecting structural material and the peripheral edge structural material is disposed to extend in a direction which intersects with the end covering member, and an end portion thereof in a direction of extension is held by the holding portion of the end covering member.
4. The laminated panel according to claim 1, wherein
one of the face plates includes an opening for allowing a specific component to be inserted therethrough, near the connecting structural material;
a component attachment bracket for attaching the specific component thereto is fixed to an edge of the opening; and the specific component is fixed to the component attachment bracket with being inserted into the opening.

5. The laminated panel according to claim 4, wherein
the connecting structural material and one of the face plates include a bolt through-part, respectively;
the connecting structural material includes a nut at a position facing the bolt through-parts in a cross-section thereof; and
the component attachment bracket is fastened by a bolt to the nut through the bolt through-parts.

6. The laminated panel according to claim 5, wherein
the bolt through-part in the connecting structural material is formed into a slit in a longitudinal direction of the connecting structural material.

7. The laminated panel according to claim 5, wherein the bolt through-part in the connecting structural material is formed at a plurality of locations at predetermined intervals in a longitudinal direction of the connecting structural material.

8. The laminated panel according to claim 2, wherein
one of the face plates includes an opening for allowing a specific component to be inserted therethrough, near the connecting structural material;
a component attachment bracket for attaching the specific component thereto is fixed to an edge of the opening; and
the specific component is fixed to the component attachment bracket with being inserted into the opening.

9. The laminated panel according to claim 3, wherein
one of the face plates includes an opening for allowing a specific component to be inserted therethrough, near the connecting structural material;
a component attachment bracket for attaching the specific component thereto is fixed to an edge of the opening; and
the specific component is fixed to the component attachment bracket with being inserted into the opening.

10. The laminated panel according to claim 8, wherein
the connecting structural material and one of the face plates include a bolt through-part, respectively;
the connecting structural material includes a nut at a position facing the bolt through-parts in a cross-section thereof; and
the component attachment bracket is fastened by a bolt to the nut through the bolt through-parts.

11. The laminated panel according to claim 9, wherein
the connecting structural material and one of the face plates include a bolt through-part, respectively;
the connecting structural material includes a nut at a position facing the bolt through-parts in a cross-section thereof; and
the component attachment bracket is fastened by a bolt to the nut through the bolt through-parts.

12. The laminated panel according to claim 6, wherein
the bolt through-part in the connecting structural material is formed at a plurality of locations at predetermined intervals in a longitudinal direction of the connecting structural material.

* * * * *